(12) United States Patent
Horn et al.

(10) Patent No.: US 11,818,741 B2
(45) Date of Patent: Nov. 14, 2023

(54) CHANNEL AWARE TONE RESERVATION PERCENTAGE REPORT FOR OPTIMIZED PAPR PERFORMANCE

(71) Applicant: QUALCOMM Incorporated, San Diego, CA (US)

(72) Inventors: Idan Michael Horn, Hod Hasharon (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/347,391

(22) Filed: Jun. 14, 2021

(65) Prior Publication Data

US 2022/0400493 A1  Dec. 15, 2022

(51) Int. Cl.
*H04W 72/542* (2023.01)
*H04L 5/00* (2006.01)
*H04L 27/26* (2006.01)

(52) U.S. Cl.
CPC ......... *H04W 72/542* (2023.01); *H04L 5/0048* (2013.01); *H04L 27/2614* (2013.01)

(58) Field of Classification Search
CPC ............... H04W 72/542; H04L 5/0048; H04L 27/2614; H04L 27/2618; H04L 27/2628
See application file for complete search history.

(56) References Cited

U.S. PATENT DOCUMENTS

| | | | | |
|---|---|---|---|---|
| 2005/0238110 | A1* | 10/2005 | Yun | H04L 27/2618 375/260 |
| 2006/0078066 | A1* | 4/2006 | Yun | H04B 7/0848 375/299 |
| 2007/0217329 | A1* | 9/2007 | Abedi | H04L 5/0044 370/480 |

(Continued)

FOREIGN PATENT DOCUMENTS

GB  2463244 A  3/2010

OTHER PUBLICATIONS

Chafii M., et al., "Adaptive Tone Reservation for Better BER Performance in a Frequency Selective Fading Channel", 2016 IEEE 83rd Vehicular Technology Conference (VTC Spring), IEEE, May 15, 2016, pp. 1-3, XP032920038, DOI: 10.1109/VTCSPRING.2016. 7504119 [retrieved on Jul. 5, 2016], paragraph [000I] p. 2, left-hand column.

(Continued)

*Primary Examiner* — Ian N Moore
*Assistant Examiner* — Sun Jong Kim
(74) *Attorney, Agent, or Firm* — Procopio, Cory, Hargreaves & Savitch LLP

(57) ABSTRACT

Methods, apparatuses, and computer-readable storage medium are provided. The methods include receiving, from a UE, an indication of a capability of the UE associated with one or more operating modes. The methods further include transmitting, to the UE, a request for a TR report corresponding to an amount of TR locations, the amount of TR locations being associated with at least one of a PAPR gain or a UE performance gain. The methods further include receiving, from the UE, a TR report comprising an indication of the amount of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes.

30 Claims, 17 Drawing Sheets

(56) References Cited

U.S. PATENT DOCUMENTS

| | | | | |
|---|---|---|---|---|
| 2009/0304097 | A1* | 12/2009 | Han | H04L 27/2618 |
| | | | | 375/260 |
| 2013/0273954 | A1* | 10/2013 | Ji | H04L 5/0057 |
| | | | | 455/509 |
| 2017/0048875 | A1* | 2/2017 | Martin | H04W 24/10 |
| 2017/0196009 | A1* | 7/2017 | Martin | H04L 5/001 |
| 2018/0359790 | A1* | 12/2018 | Ingale | H04W 72/51 |
| 2021/0298011 | A1* | 9/2021 | Beale | H04L 1/0068 |
| 2021/0306193 | A1* | 9/2021 | Raphaeli | H04L 5/0007 |
| 2022/0053500 | A1* | 2/2022 | Han | H04W 24/10 |
| 2023/0109359 | A1* | 4/2023 | Back | H04W 52/383 |
| | | | | 370/329 |

OTHER PUBLICATIONS

Chang W-T., et al., "Peak-to-Average Power Ratio Reduction of OFDM based on Adaptive Peak Reduction Carriers", IEEE the 18th International Symposium on Personal, Indoor and Mobile Radio Communications, PIMRC, IEEE, PI, XX, Sep. 1, 2007, pp. 1-4, XP031168347, ISBN: 978-1-4244-1143-6, abstract.

Ghassemi A., et al., "Tone Reservation based Peak Power Reduction in OFDMA Uplink Systems", 2012 IEEE International Conference on Communications (ICC), IEEE, Jun. 10, 2012, pp. 4653-4657, XP032274398, DOI: 10.1109/ICC.2012.6364572, ISBN: 978-1-4577-2052-9, paragraph [000I].

International Search Report and Written Opinion—PCT/US2022/029468—ISA/EPO—dated Sep. 30, 2022.

Tsouri G.R., et al., "Capacity Analysis and Optimisation of OFDM with Distortionless PAPR Reduction", European Transactions on Telecommunications, Wiley & Sons, Chichester, GB, vol. 19, No. 7, Nov. 1, 2008, pp. 781-790, XP001517660, ISSN: 1124-318X, DOI: 10.1002/ETT.1330, abstract, p. 789, left-hand column.

\* cited by examiner

CHANNEL AWARE TONE RESERVATION PERCENTAGE REPORT FOR OPTIMIZED PAPR PERFORMANCE

TECHNICAL FIELD

The present disclosure relates generally to communication systems, and more particularly, to wireless communication systems with tone reservation (TR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to transmit, to a base station, an indication of a capability of the UE associated with one or more operating modes. The memory and the at least one processor coupled to the memory may be further configured to receive, from the base station, a request for a TR report corresponding to an amount of TR locations, the amount of TR locations being associated with at least one of a peak-to-average power ratio (PAPR) gain or a UE performance gain. The memory and the at least one processor coupled to the memory may be further configured to calculate, based on the received request for the TR report, the amount of TR locations of a plurality of TR locations based on one or more parameters, the one or more parameters including at least one of a UE speed, a Doppler spread, a delay spread, a signal-to-interference plus noise ratio (SINR), a modulation and coding scheme (MCS), a rank indicating an amount of data layers, or a channel response, the amount of TR locations being associated with the one or more operating modes. The memory and the at least one processor coupled to the memory may be further configured to transmit, to the base station, the TR report including an indication of the amount of TR locations based on the one or more parameters.

In an aspect of the disclosure, a method, a computer-readable medium, and an apparatus at a base station are provided. The apparatus may include a memory and at least one processor coupled to the memory. The memory and the at least one processor coupled to the memory may be configured to receive, from a UE, an indication of a capability of the UE associated with one or more operating modes. The memory and the at least one processor coupled to the memory may be further configured to transmit, to the UE, a request for a TR report corresponding to an amount of TR locations, the amount of TR locations being associated with at least one of a PAPR gain or a UE performance gain. The memory and the at least one processor coupled to the memory may be further configured to receive, from the UE, a TR report including an indication of the amount of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
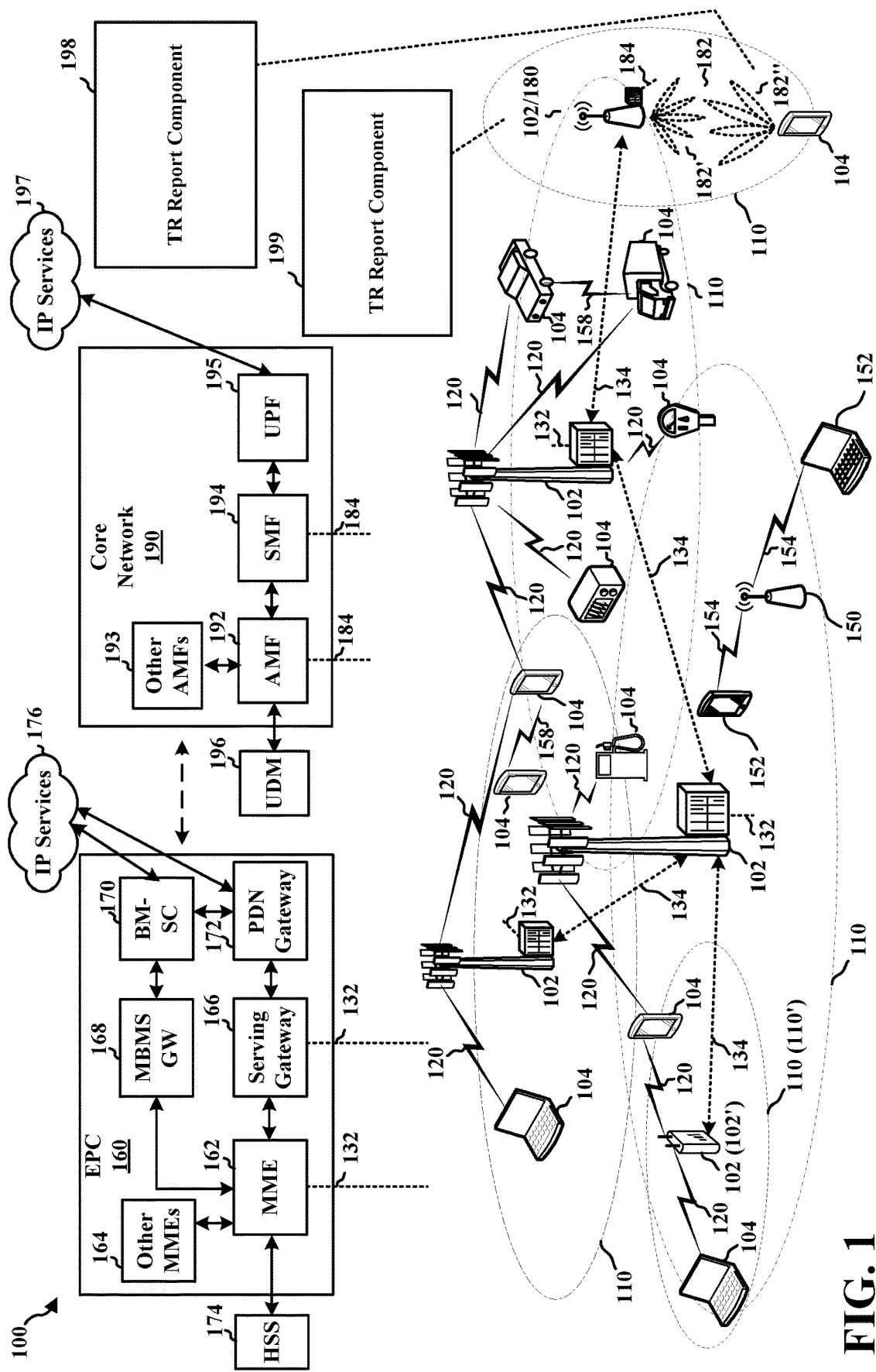
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a TR report component 198. In some aspects, the TR report component 198 may be configured to transmit, to a base station, an indication of a capability of the UE associated with one or more operating modes. In some aspects, the TR report component 198 may be further configured to receive, from the base station, a request for a TR report corresponding to an amount of TR locations, the amount of TR locations being associated with at least one of a PAPR gain or a UE performance gain. In some aspects, the TR report component 198 may be further configured to calculate, based on the received request for the TR report, the amount of TR locations of a plurality of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes. In some aspects, the TR report component 198 may be further configured to transmit, to the base station, the TR report including an indication of the amount of TR locations based on the one or more parameters.

In certain aspects, the base station 180 may include a TR report component 199. In some aspects, the TR report component 199 may be configured to receive, from a UE, an indication of a capability of the UE associated with one or more operating modes. In some aspects, the TR report component 199 may be further configured to transmit, to the UE, a request for a TR report corresponding to an amount of TR locations, the amount of TR locations being associated with at least one of a PAPR gain or a UE performance gain. In some aspects, the TR report component 199 may be further configured to receive, from the UE, a TR report including an indication of the amount of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes.

Although the following description may be focused on 5G NR, the concepts described herein may be applicable to other similar areas, such as LTE, LTE-A, CDMA, GSM, and other wireless technologies.

Figure 2:
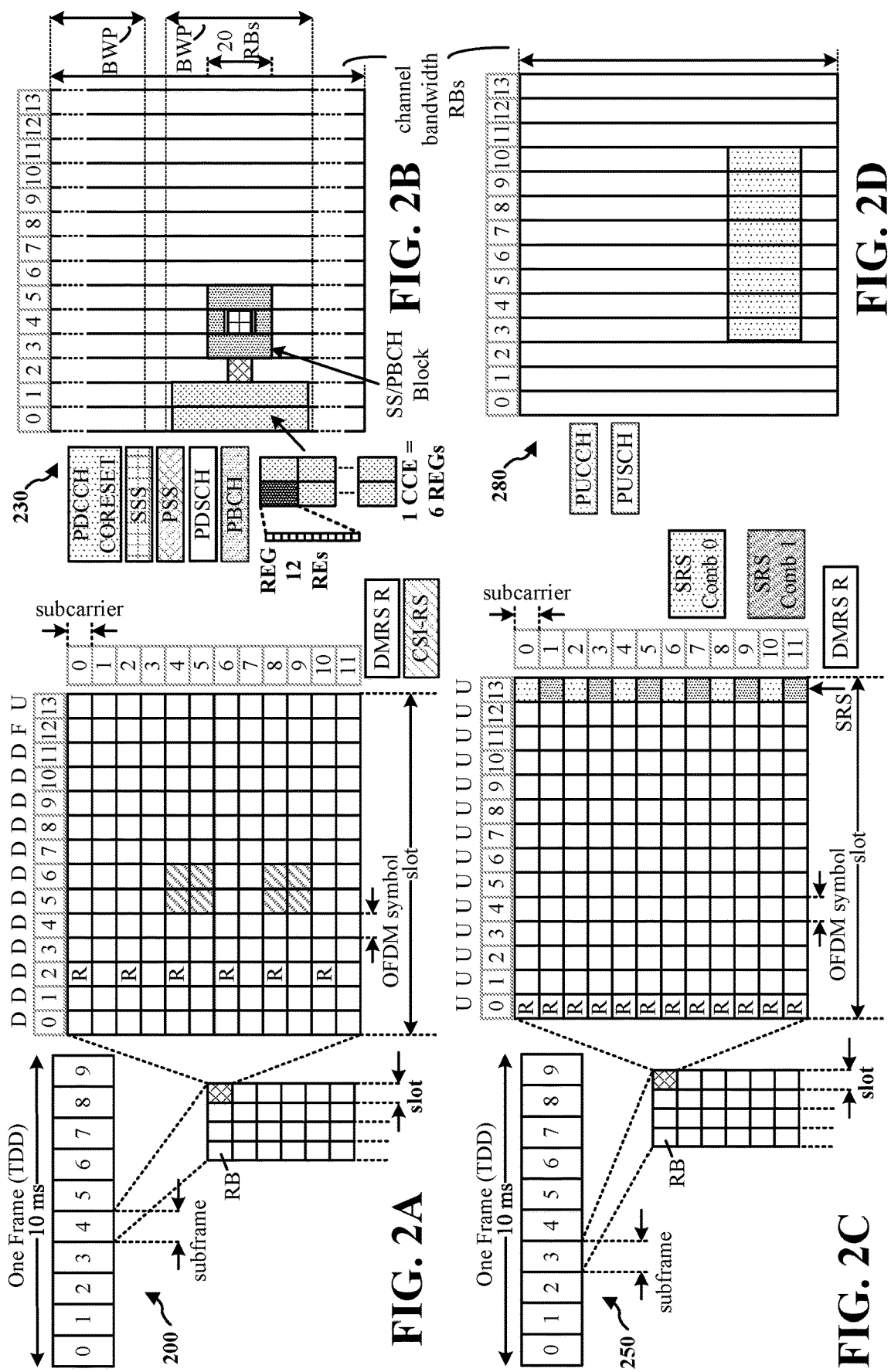
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
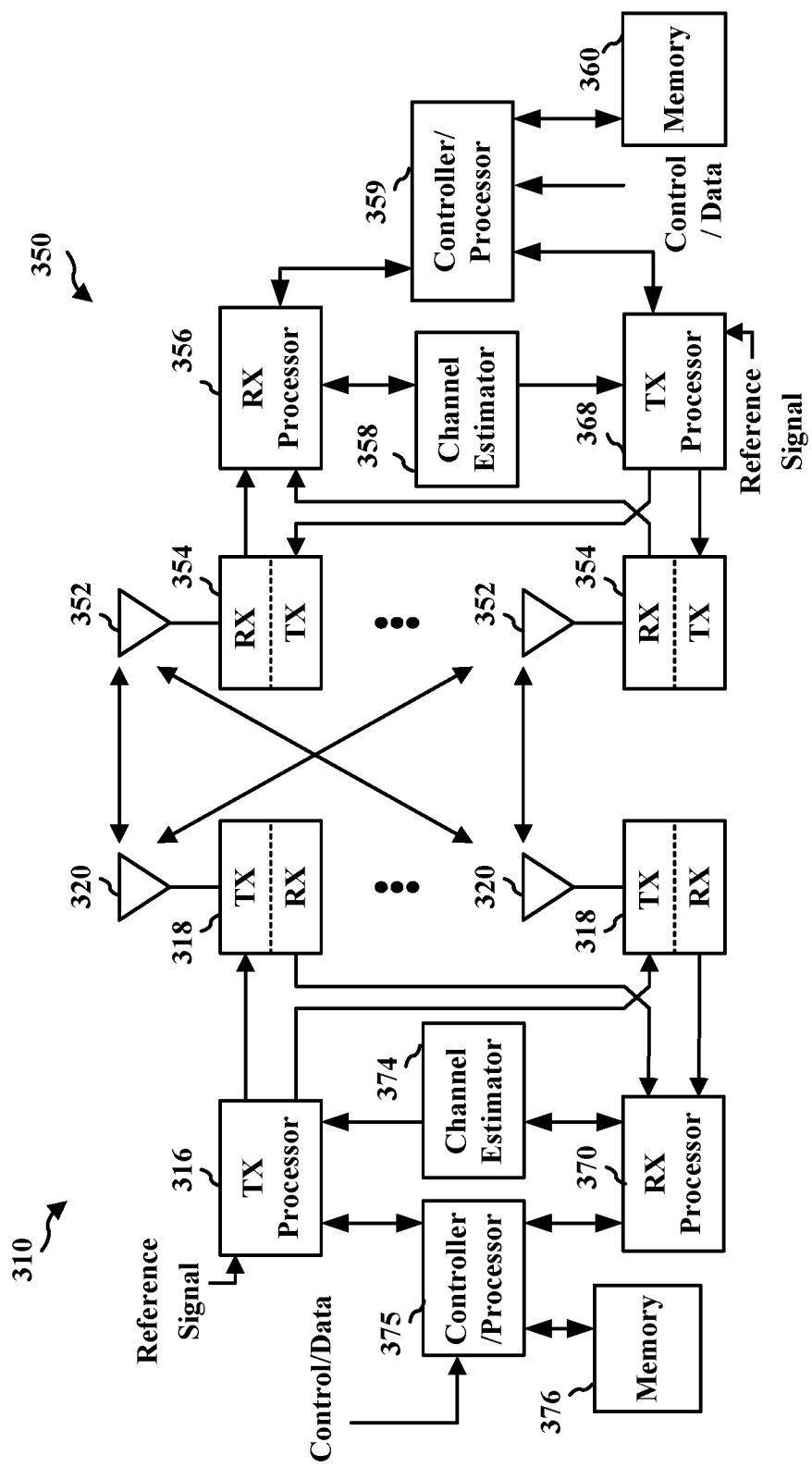
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with TR report component 198 of FIG. 1.

At least one of the TX processor 316, the RX processor 370, and the controller/processor 375 may be configured to perform aspects in connection with TR report component 199 of FIG. 1.

For some frequencies, such as mmWave (FR2) or sub-THz (FR4 and beyond), the bandwidth size may be increased to above a certain amount, e.g., 1 GHz, which may in turn enable larger SCS (such as SCS up to 1 MHz). The slot latency may be linearly decreased as well. For base stations and UEs operating in those frequencies, RF power consumption may be large. For example, for a base station operating in mmWave or Sub-THz, power amplification may consume thousands of Watts.

In some wireless communication systems, reduced power—PAPR reduction mechanisms based on TR may be used to save power. A TR may use REs where the channel is weak (e.g., in terms of energy or capacity) based on DM-RS channel estimation. Such mechanisms may be referred to as channel-aware TR because the TR may be adjusted based on the channel estimation. Channel-aware TR may achieve joint PAPR and performance gains, such as gains between one to three decibels (dBs). For a base station to know the best amount of TR to be used, knowing the UE performance at each SINR, MCS, rank, channel response, speed, or the like, may be helpful. However, reporting all of SINR, MCS, rank, channel response, speed, among other parameters, may introduce a large signaling overhead which in turn consumes a large amount of resources. Aspects provided herein may enable a UE to dynamically report a TR amount (e.g., in the form of a percentage) to be used for downlink transmission for improved PAPR gains.

Figure 4:
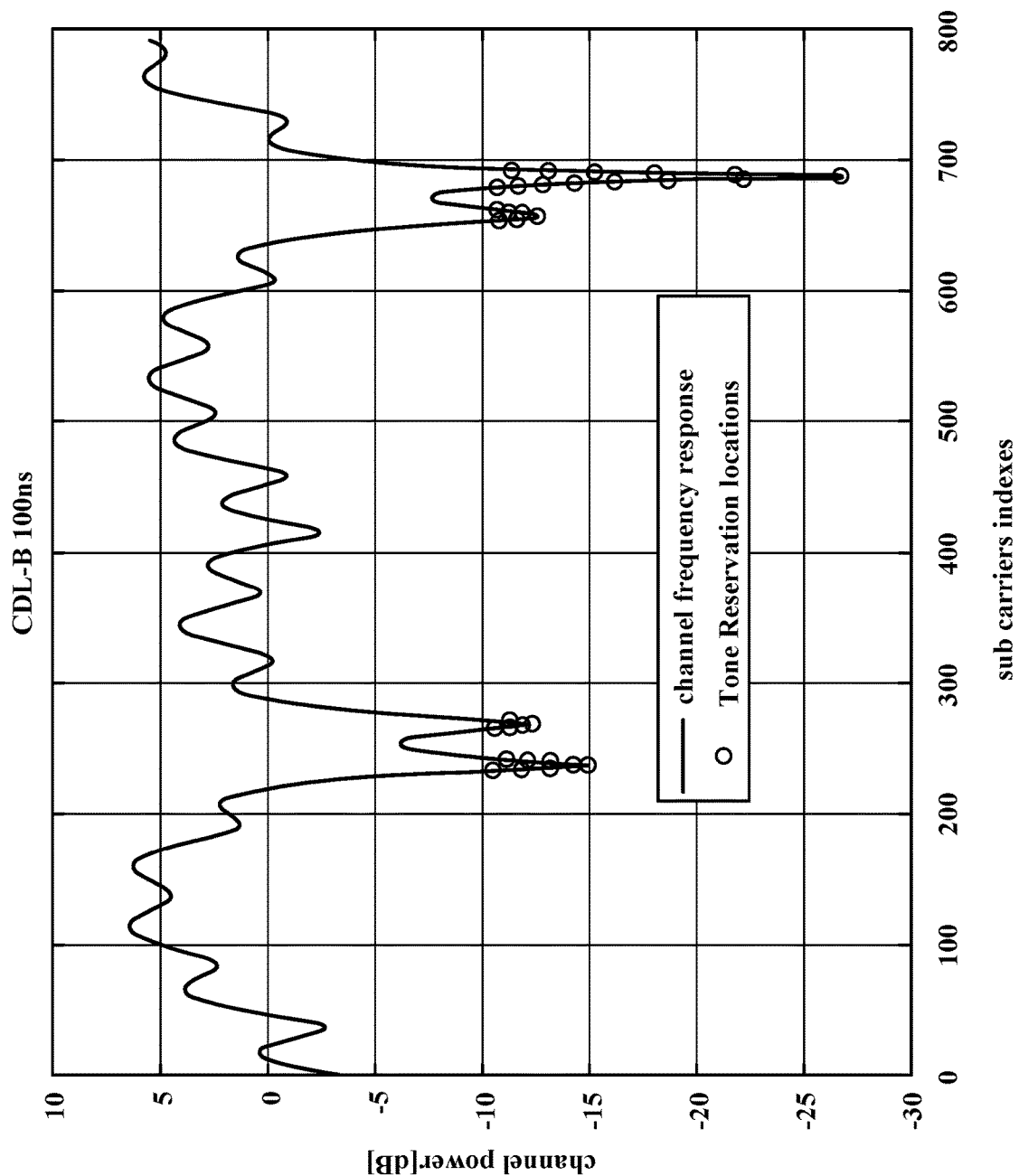
FIG. 4 is a diagram illustrating example tone reservation.

FIG. 4 is a diagram 400 illustrating example tone reservation. A tone may refer to a part of a TB/CB where a bit may be stored. The example illustrated in FIG. 4 is based on 4% TR and a clustered delay line (CDL) model B (CDL-B). CDL models may be defined for the full frequency range from 0.5 GHz to 100 GHz with a maximum bandwidth of 2 GHz. CDL models may be implemented by certain aspects, e.g., coefficient generation or generating tapped delay line (TDL) model using a spatial filter. An example TDL model may be for simplified evaluations, e.g., for non-MIMO evaluations, and defined for the frequency range from 0.5 GHz to 100 GHz with a maximum bandwidth of 2 GHz. Example TDL models may be associated with different channel profiles for non-line of sight (NLOS).

Figure 5:
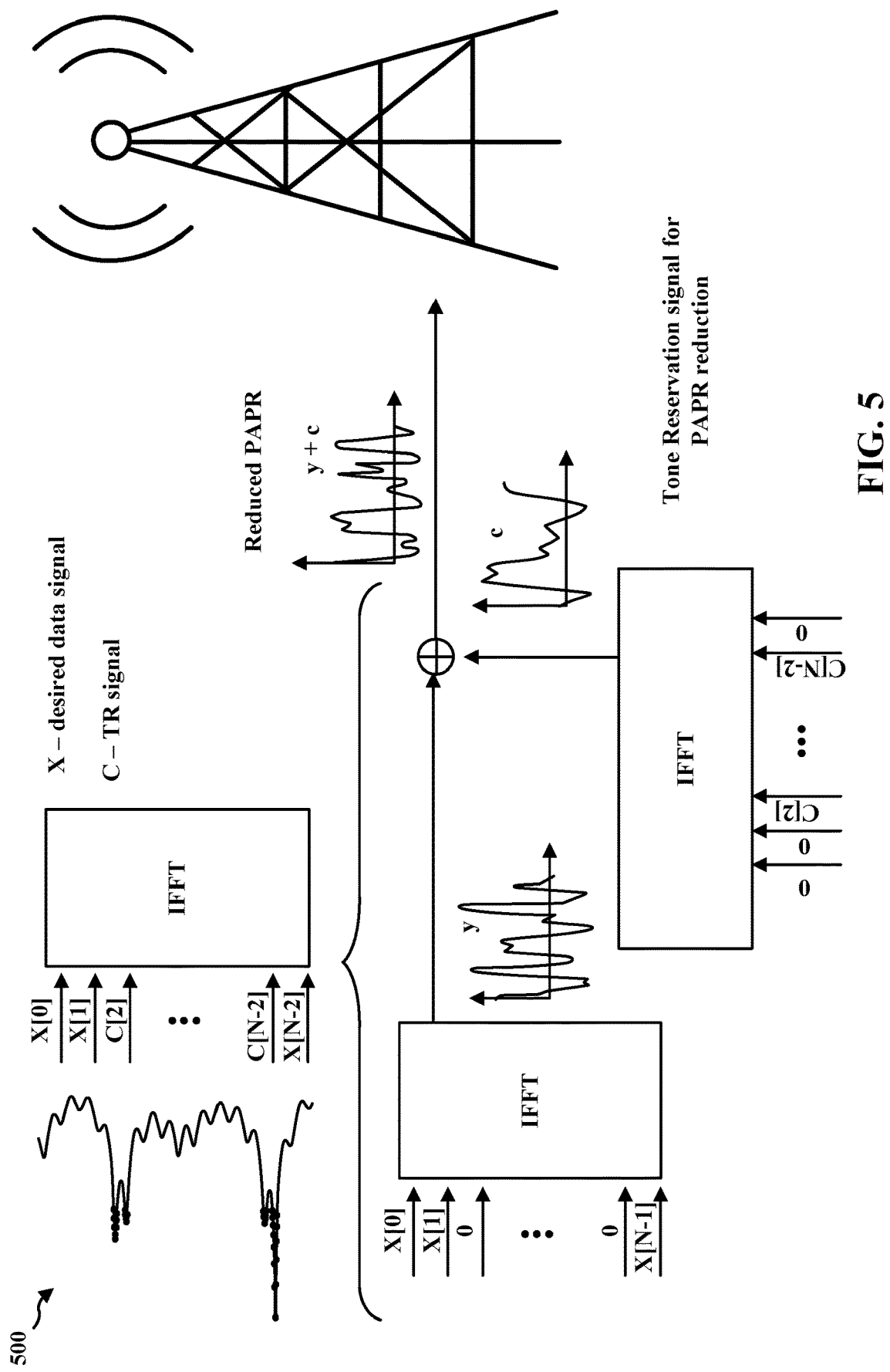
FIG. 5 is a diagram illustrating example tone reservation.

FIG. 5 is a diagram 500 illustrating an example tone reservation. As illustrated in FIG. 5, inverse fast Fourier transform (IFFT) may be performed on desired data signals and TR signals and may be combined and transmitted together. The TR signal may be for PAPR reduction and the combined signal may be associated with a reduced PAPR.

Figure 6:
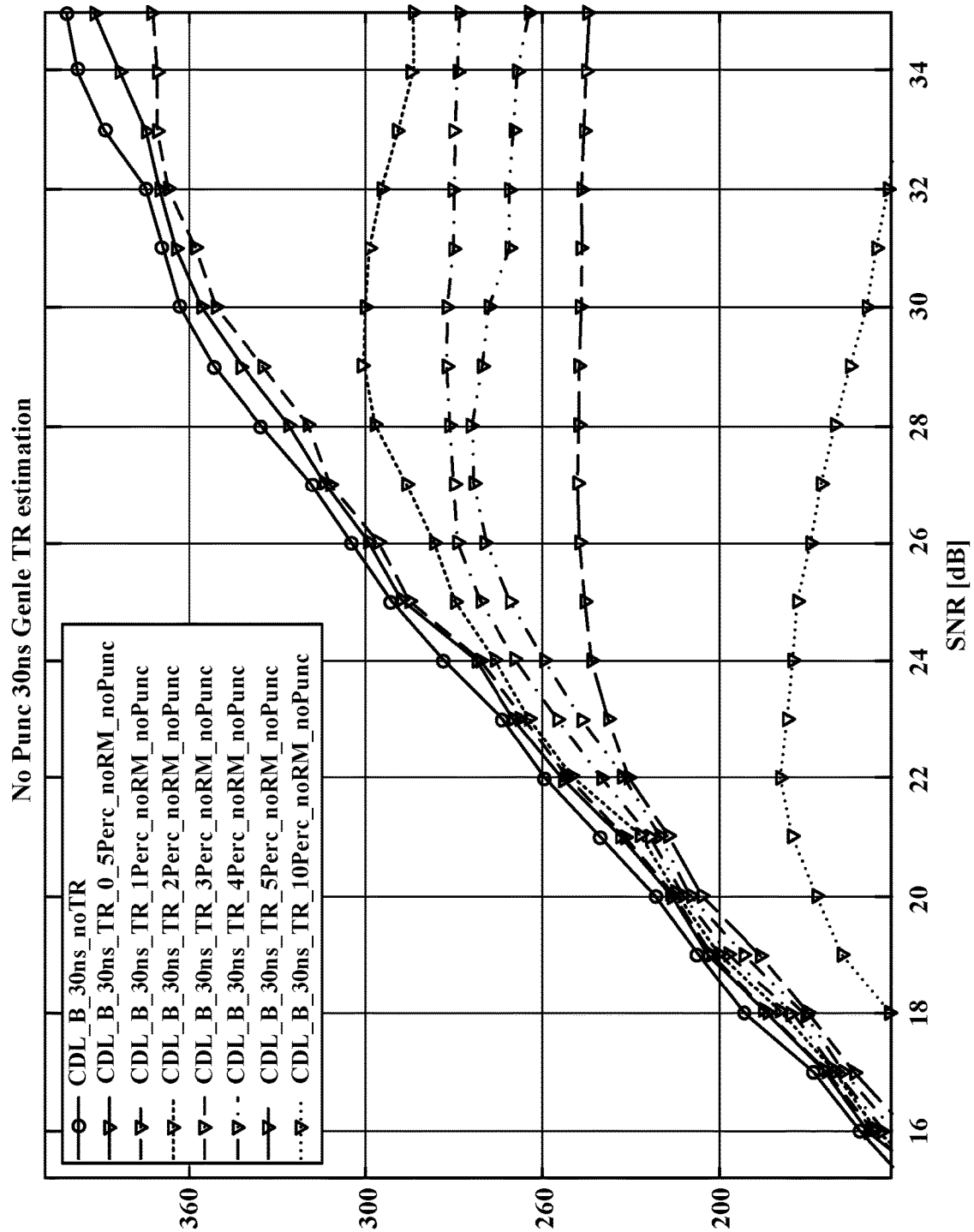
FIG. 6 is a diagram illustrating example UE performance with no puncturing.

FIG. 6 is a diagram 600 illustrating an example UE performance with no puncturing and no rate-matching. No puncturing may refer to an operating mode where the base station or a UE, e.g., the UE 1102, may not perform puncturing. Puncturing may refer to the process of removing one or more bits, such as parity bits, after encoding with an error correction code. In some aspects, puncturing (e.g., the removal of one or more parity bits) may be based on a puncturing pattern. The puncturing pattern may be known to the base station and/or the UE. In some examples, puncturing may remove punctured variables that correspond with information bits.

A rate-matching process may extract the exact set of bits to be transmitted within a transmission time interval (TTI) (such as one or more slots). For example, rate matching may match the number of bits in a transport block (TB) to the number of bits that can be transmitted in a given allocation. Rate matching may include sub-block interleaving, bit collection, and pruning. Rate matching may be performed over codebooks (CBs) and may be performed after the CBs are turbo encoded. Rate matching output size may be determined before starting the first slot PUSCH of a TB processing over multi-slot PUSCH (TBoMS). In some wireless communication systems, rate matching may use available tones for a PUSCH. As illustrated in FIG. 6, the throughput for 10 percent TR is significantly lower than the throughput for other mechanisms. The throughput for 5 percent TR, 4 percent TR, 4 percent TR, and 2 percent TR are all considerably lower than the throughput with no TR.

Figure 7:
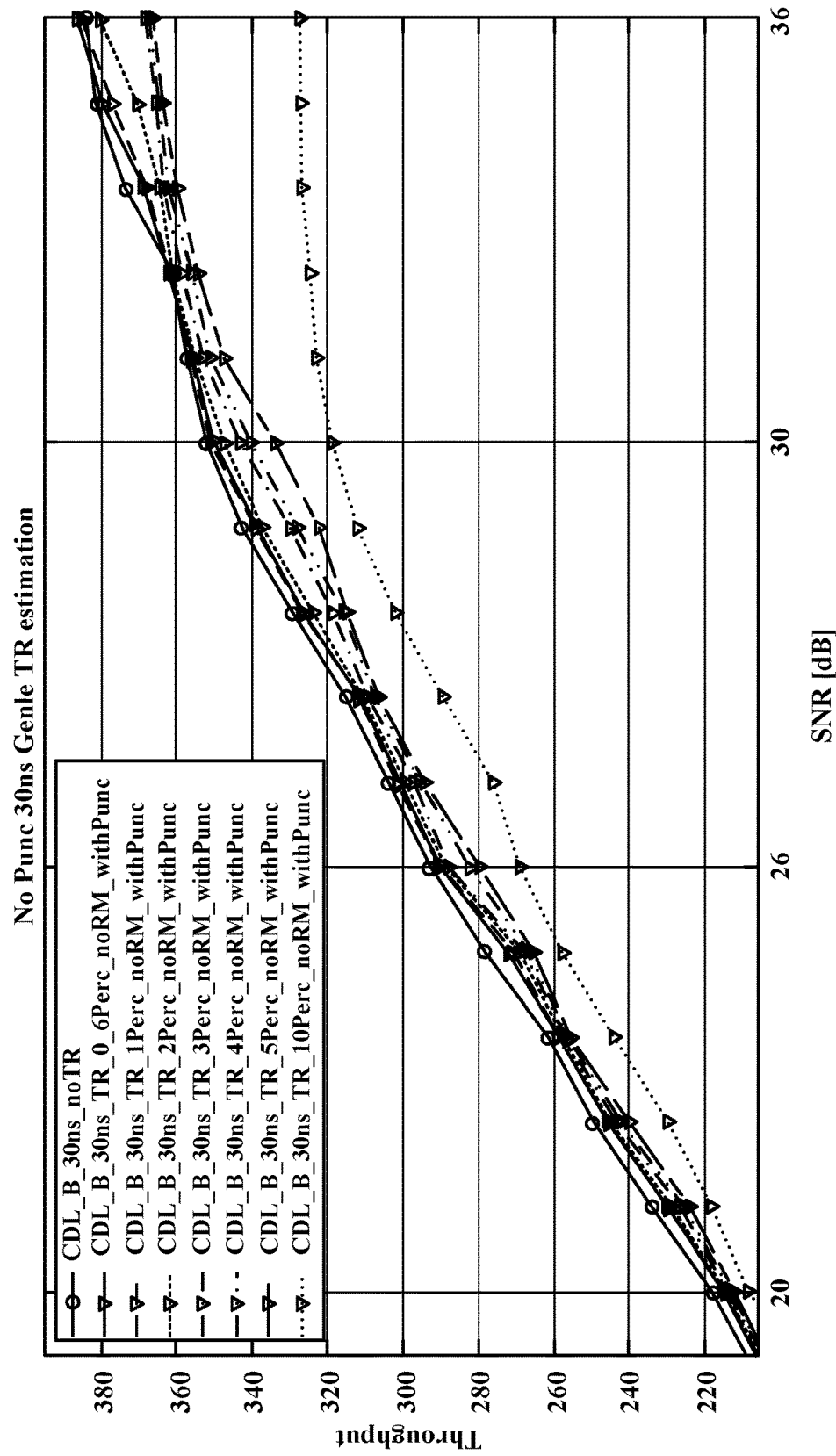
FIG. 7 is a diagram illustrating example UE performance with puncturing.

FIG. 7 is a diagram 700 illustrating example UE performance with puncturing and no rate-matching. As illustrated in FIG. 7, the throughput for 10 percent TR with puncturing increased by a large amount compared with the throughput for 10 percent TR with no puncturing. The throughput for 5 percent TR, 4 percent TR, 4 percent TR, and 2 percent TR are all considerably higher than the corresponding throughput with no puncturing.

Figure 8:
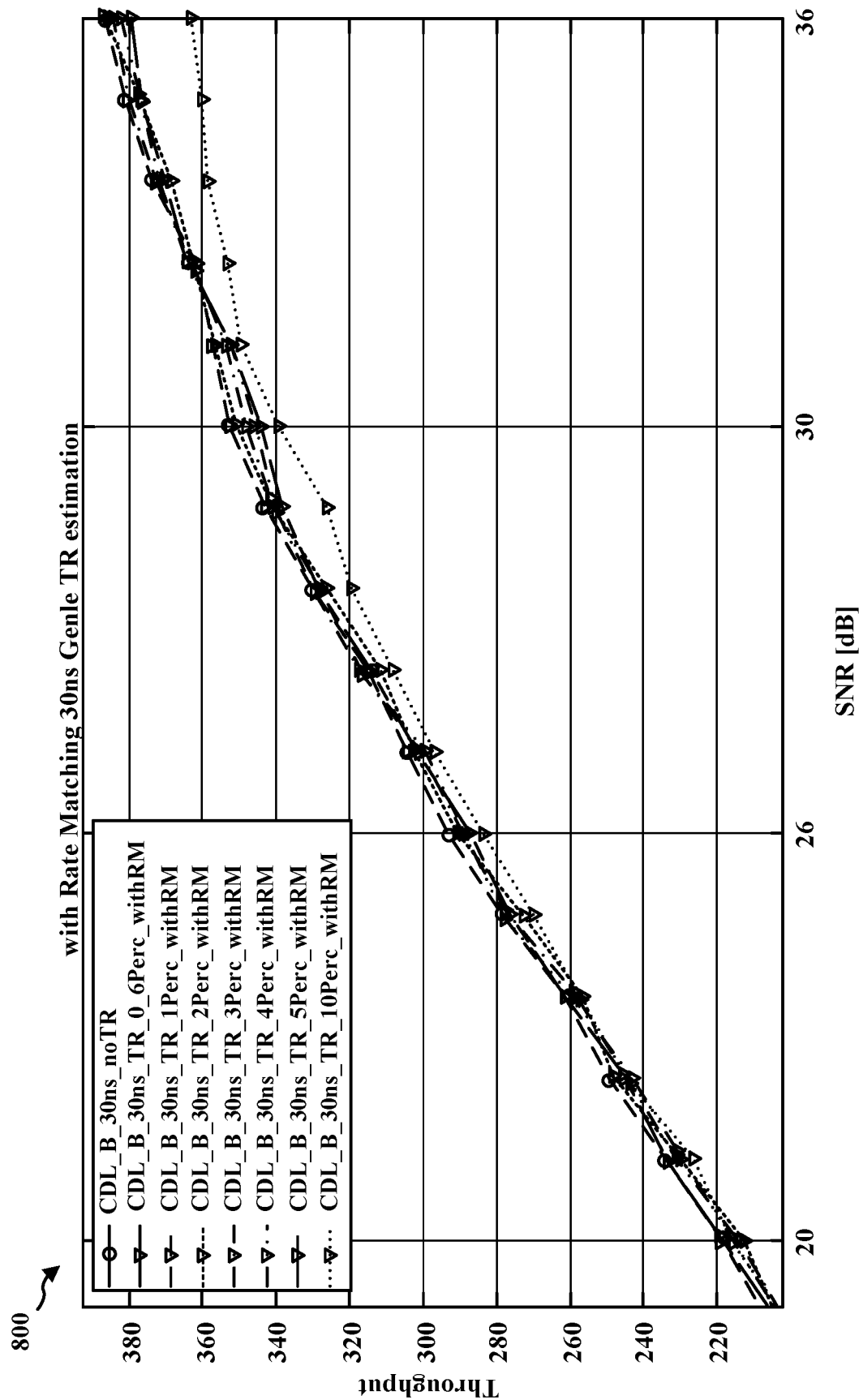
FIG. 8 is a diagram illustrating example UE performance with rate-matching.

FIG. 8 is a diagram 800 illustrating example UE performance with rate-matching. As illustrated in FIG. 8, the throughput for 10 percent TR, 5 percent TR, 4 percent TR, 4 percent TR, and 2 percent TR are all considerably higher than the corresponding throughput with no rate matching.

Figure 9:
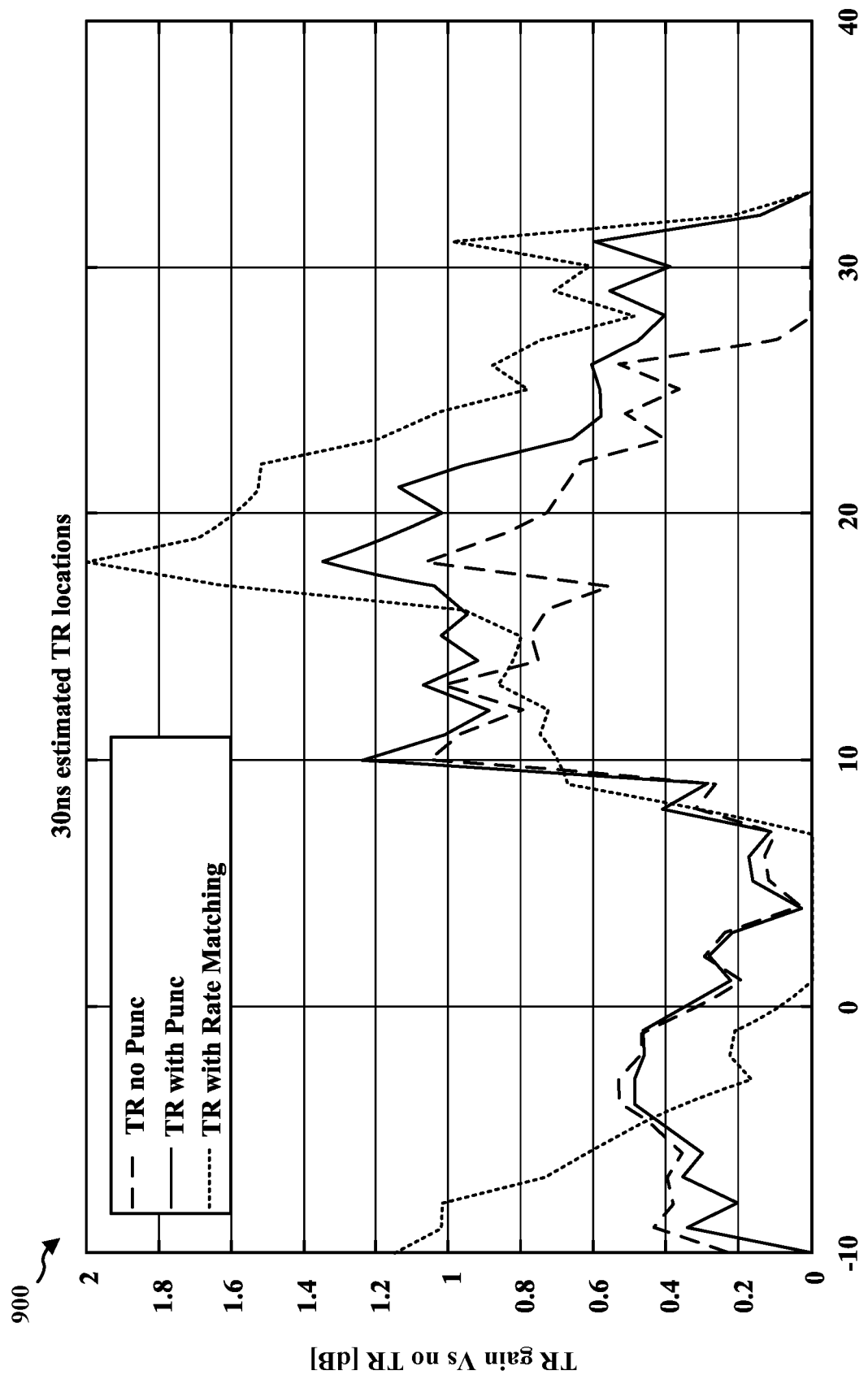
FIG. 9 is a diagram illustrating example comparison of UE performances with rate-matching, no puncturing, and puncturing.

FIG. 9 is a diagram 900 illustrating example comparison of UE performances with rate-matching, no puncturing, and puncturing. As illustrated in FIG. 9, operating mode with the highest TR gain is dependent on a variety of factors such as SNR. One operating mode may outperform another depending on the situation.

Figure 10:
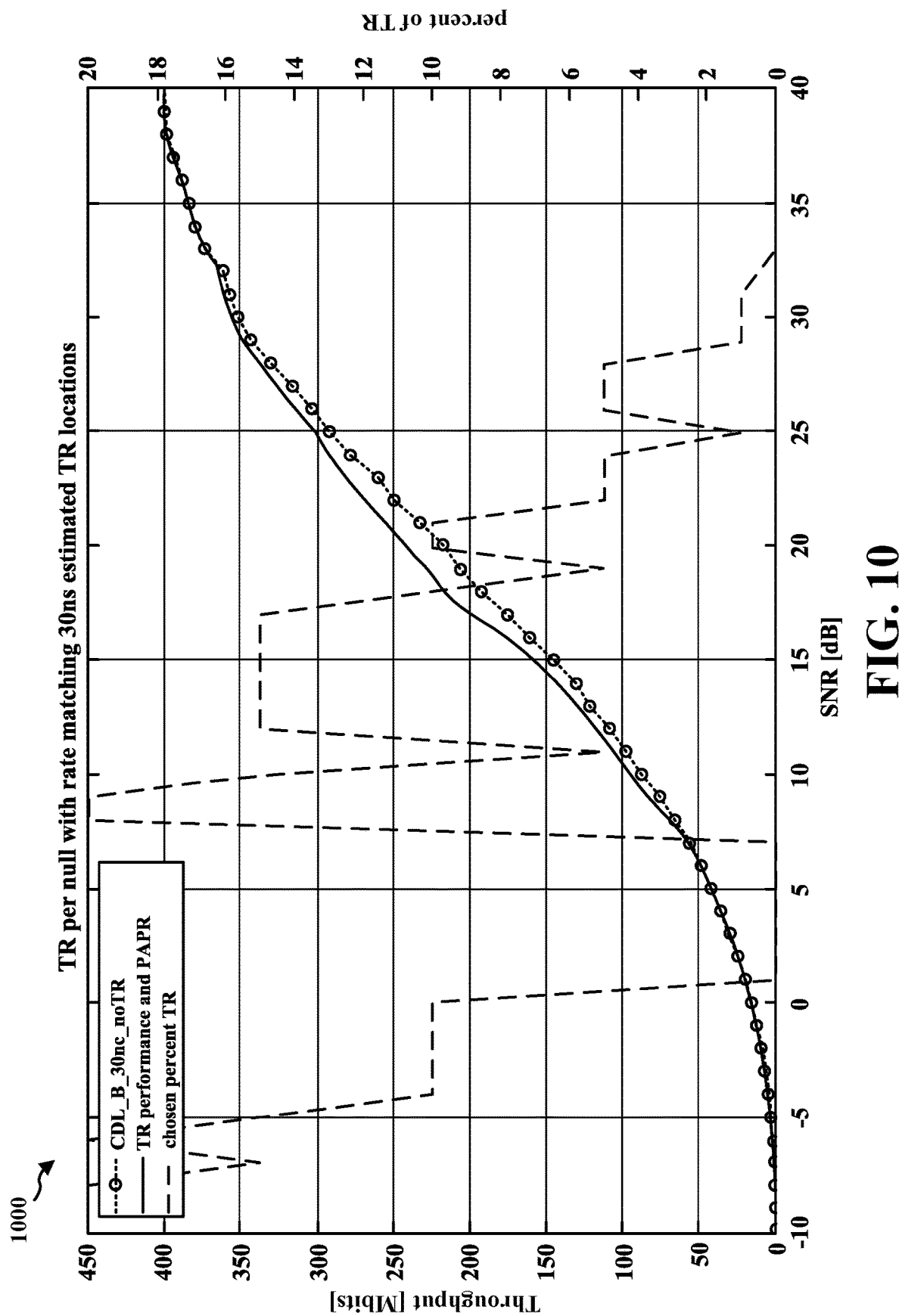
FIG. 10 is a diagram illustrating example UE performance for TR per null with rate-matching.

FIG. 10 is a diagram 1000 illustrating example UE performance for TR per null with rate-matching. As illustrated in FIG. 10, different TR percentages may perform differently depending on the channel condition and SNR.

Figure 11:
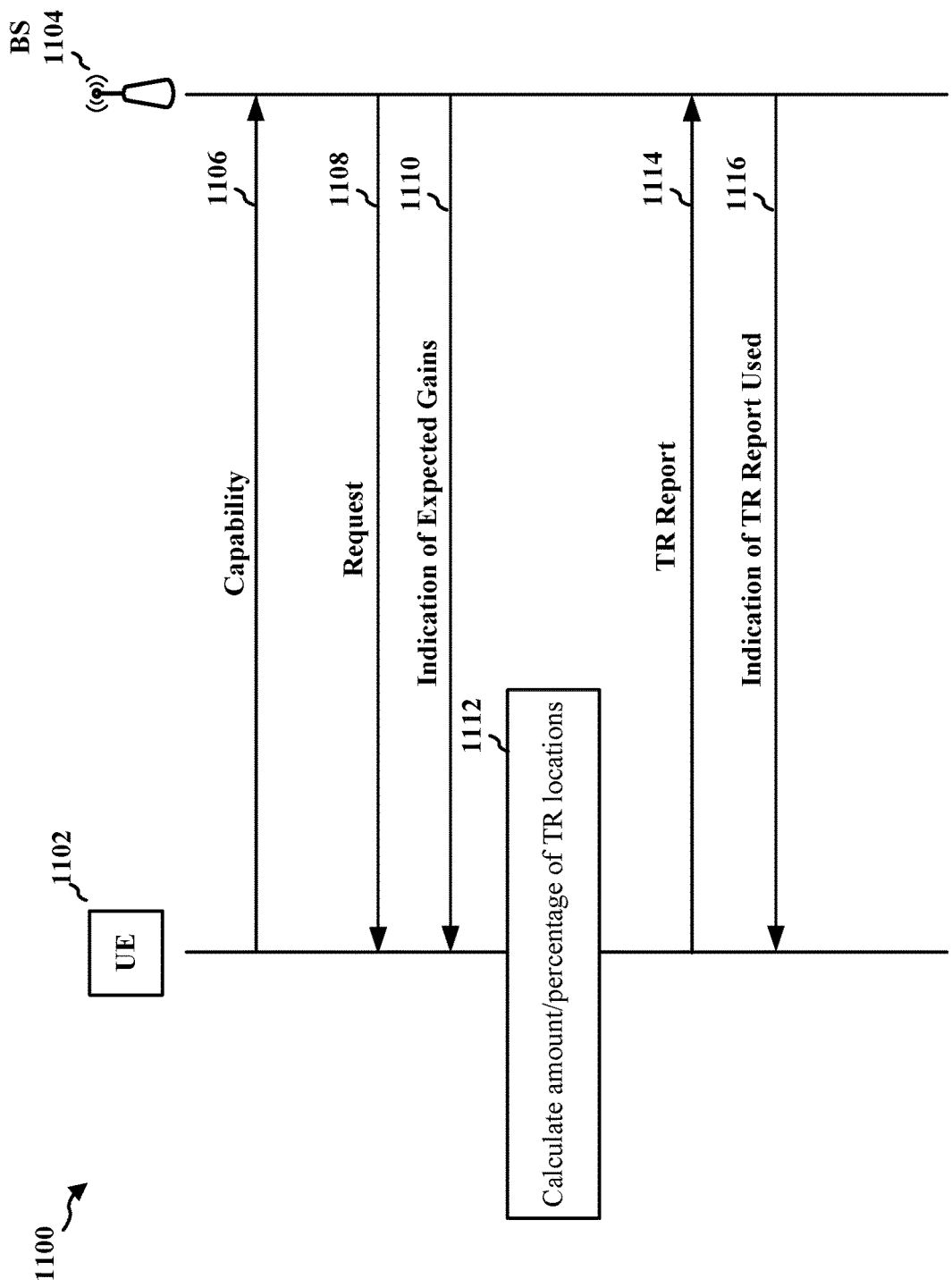
FIG. 11 is a diagram illustrating example communication flow between a UE and a base station.

FIG. 11 is a diagram 1100 illustrating example communication flow between a UE 1102 and a base station 1104. As illustrated in FIG. 11, the UE 1102 may establish a connection with the base station 1104. Upon establishing the connection, the UE 1102 may transmit a UE channel aware capability report 1106 to the base station 1104. The UE channel aware capability report 1106 may include one or more applicable working modes of the UE 1102. For example, the one or more applicable working modes may include a puncturing mode, a non-puncturing mode, a rate matching mode, or the like. The puncturing mode may be an operating mode where the base station 1104 or the UE 1102 may puncture by removing one or more parity bits after encoding with an error correction code. The non-puncturing mode may be an operating mode where the base station 1104 or the UE 1102 may not perform puncture. The rate-matching mode may be an operating mode where the base station 1104 or the UE 1102 may perform rate-matching.

After the connection is established, the base station 1104 may transmit a request 1108 to the UE 1102 requesting a UE TR report 1114. The TR report 1114 may include a recommended amount of TR to be applied on the downlink channel. The TR report 1114 may include one number of recommended percentage/amount according to the current channel state feedback (CSF)—rank indicator (RI), channel quality indicator (CQI), pre-coding matrix indicator (PMI) report, or according to the PDSCH parameters associated with a last slot. In some aspects, the base station 1104 may also signal, such as in the request 1108, desired rank, PMI, or MCS to be considered for the TR report. The TR report 1114 may be in turn based on the base station 1104's signaling of the desired rank, PMI, and MCS to be considered for the TR report. At 1112, the UE 1102 may calculate a best TR amount by performing hypothesis test on the PDSCH, by predefined LUTs (or other methods) and may include the UE performance joint with the expected PAPR gain. The term "predefined" may be used herein to describe a condition that is known to the UE and the base station before the initial connection is established. In some aspects, the expected PAPR gains may be transmitted by the base station 1104 to the UE 1102 in the indication of expected gains 1110. In some aspects, the PAPR expected gains 1110 may be per TR amount/percentage for the UE 1102 to estimate the performance gains and the TR gains. In some aspects, the PAPR expected gains may be signaled via radio resource control (RRC) messages or a MAC control element (CE) (MAC-CE).

In some instances, the expected PAPR gains may be predefined instead. In some aspects, there may be a LUT for each rank, CQI, or MCS and for each value of the rank, CQI, or MCS, there may be a predefined value of a TR percentage or amount. In such aspects, the TR report 1114 may include a relative value (such as a ratio or an increment or decrement) compared with the predefined value which may in turn reduce the TR report size due to an expected small difference between the predefined value in the LUT and the signaled value. In some aspects, the TR report 1114 may include a relative value (such as a ratio or an increment or decrement) compared with another TR report, such as a last transmitted TR report.

In some aspects, the TR report 1114 may include a vector of values which may include several TR amount values such as for several SINRs, MCSs, or the like. The format of the vector of values such as the SINRs and MCSs may be based on the base station 1104's configuration. In some aspects, such configurations may be signaled by the base station to the UE or may be predefined. In some aspects, the configuration may be changed based on changes in the environment where the base station 1104 operates in (such as the channel).

In some instances, the TR report 1114 may be transmitted via a MAC-CE, radio resource control (RRC) messages, or a channel state feedback (CSF) report. In some aspects, the base station 1104 may define a periodicity in which the TR report may be transmitted and may signal the periodicity in the request 1108. In some aspects, the periodicity may be defined based on CSI-RS signaling from the UE 1102 or based on a CSF periodicity.

In some aspects, the TR report 1114 may include a recommended operating mode of the TR to be applied on a downlink channel, such as a puncturing mode, a non-puncturing mode, a rate-matching mode, or the like. In some aspects, the TR report 1114 may include one or more desired location estimation metrics, such as channel energy, capacity, covariance determinant or condition number, or the like.

In some instances, after receiving the TR report 1114, the base station 1104 may use the TR report 1114 in upcoming downlink transmissions. In some aspects, the base station 1104 may transmit an indication 1116 to the UE 1102 representing the TR report 1114 is being used. In some aspects, the indication 1116 may be one bit representing whether the TR report 1114 is being used. In some aspects, the indication 1116 may be transmitted via DCI, a MAC-CE, or an RRC message.

Figure 12:
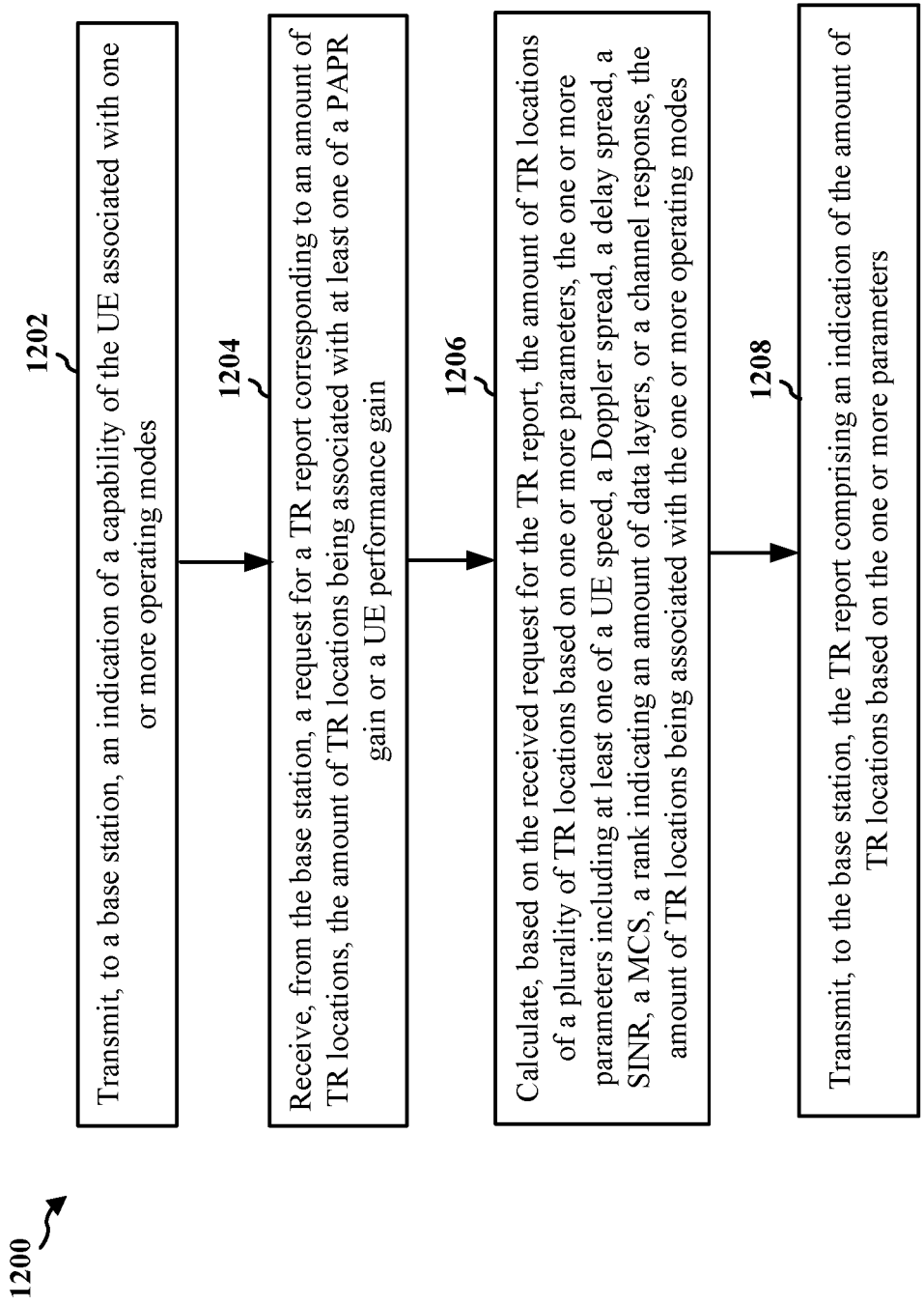
FIG. 12 is a flowchart of a method of wireless communication.

FIG. 12 is a flowchart 1200 of a method of wireless communication. The method may be performed by a UE (e.g., the UE 104, the UE 1102; the apparatus 1402).

At 1202, the UE may transmit, to a base station, an indication of a capability of the UE associated with one or more operating modes. For example, the UE 1102 may transmit, to a base station 1104, an indication of a capability 1106 of the UE 1102 associated with one or more operating modes. In some aspects, 1202 may be performed by capability component 1442 of FIG. 14.

At 1204, the UE may receive, from the base station, a request for a TR report corresponding to an amount of TR locations. The amount of TR locations may be associated with at least one of a PAPR gain or a UE performance gain. For example, the UE 1102 may receive, from the base station 1104, a request 1108 for a TR report corresponding to an amount of TR locations. In some aspects, 1204 may be performed by TR report component 1444 of FIG. 14.

At 1206, the UE may calculate, based on the received request for the TR report, the amount of TR locations of a plurality of TR locations based on one or more parameters. The one or more parameters may include at least one of a UE speed, a Doppler spread, a delay spread, a SINR, a MCS, a rank indicating an amount of data layers, or a channel response. The amount of TR locations may be associated with the one or more operating modes. For example, the UE 1102 may calculate, based on the received request for the TR report, the amount of TR locations of a plurality of TR locations based on one or more parameters. In some aspects, 1206 may be performed by calculate component 1446 of FIG. 14.

At 1208, the UE may transmit, to the base station, the TR report including an indication of the amount of TR locations based on the one or more parameters. For example, the UE 1102 may transmit, to the base station 1104, the TR report 1114 including an indication of the amount of TR locations based on the one or more parameters. In some aspects, 1208 may be performed by TR report component 1444 of FIG. 14.

Figure 13:
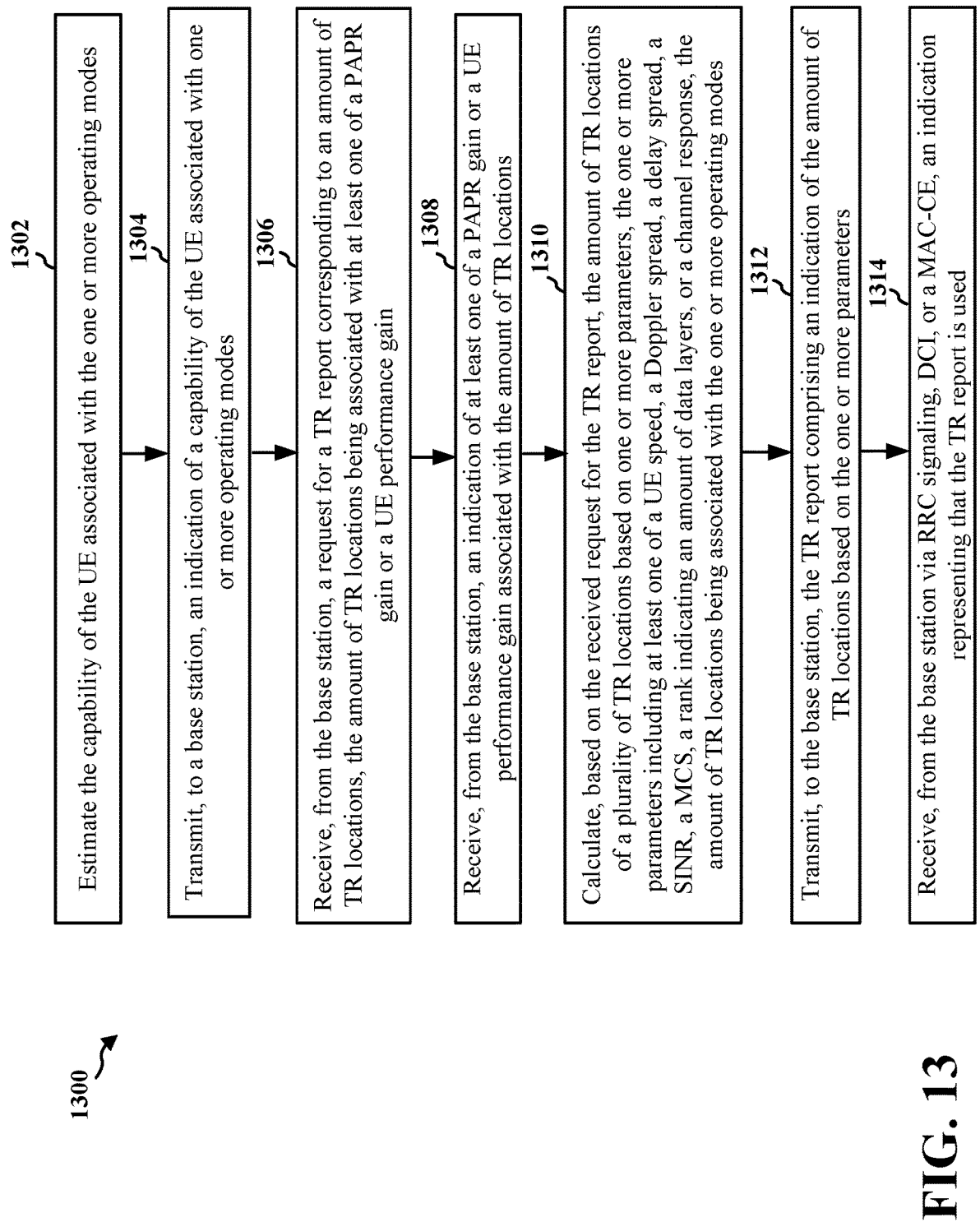
FIG. 13 is a flowchart of a method of wireless communication.

FIG. 13 is a flowchart 1300 of a method of wireless communication. The method may be performed by a UE (e.g., the UE 104, the UE 1102; the apparatus 1402).

At 1302, the UE may estimate the capability of the UE associated with the one or more operating modes. For example, the UE 1102 may estimate the capability of the UE associated with the one or more operating modes. In some aspects, 1302 may be performed by capability component 1442 of FIG. 14. In some aspects, the one or more operating modes may correspond to at least one of a non-puncturing mode, a puncturing mode, or a rate matching mode. The non-puncturing mode may be unassociated with the amount of TR locations. The puncturing mode may correspond to one or more subcarriers that are demodulated to a zero value for the amount of TR locations. The rate matching mode may correspond to a decreased transform block size or an increased code rate associated with the amount of TR locations.

At 1304, the UE may transmit, to a base station, an indication of a capability of the UE associated with one or more operating modes. For example, the UE 1102 may transmit, to a base station 1104, an indication of a capability 1106 of the UE 1102 associated with one or more operating modes. In some aspects, 1304 may be performed by capability component 1442 of FIG. 14.

At 1306, the UE may receive, from the base station, a request for a TR report corresponding to an amount of TR locations. The amount of TR locations may be associated with at least one of a PAPR gain or a UE performance gain. For example, the UE 1102 may receive, from the base station 1104, a request 1108 for a TR report corresponding to an amount of TR locations. In some aspects, 1306 may be performed by TR report component 1444 of FIG. 14. In some aspects, the request for the TR report may be received via RRC signaling, DCI, or a MAC-CE. In some aspects, the amount of TR locations may correspond to a percentage of TR locations. In some aspects, the amount of TR locations may be based on a channel awareness, a number of predefined TR locations, or signaled from the base station.

At 1308, the UE may receive, from the base station, an indication of at least one of a PAPR gain or a UE performance gain associated with the amount of TR locations. For example, the UE 1102 may receive, from the base station 1104, an indication 1110 of at least one of a PAPR gain or a UE performance gain associated with the amount of TR locations. In some aspects, 1308 may be performed by indication component 1448 of FIG. 14. In some aspects, at least one of a PAPR gain or a UE performance gain associated with the amount of TR locations may be predefined or preconfigured.

At 1310, the UE may calculate, based on the received request for the TR report, the amount of TR locations of a plurality of TR locations based on one or more parameters. The one or more parameters may include at least one of a UE speed, a Doppler spread, a delay spread, a SINR, a MCS, a rank indicating an amount of data layers, or a channel response. The amount of TR locations may be associated with the one or more operating modes. For example, the UE 1102 may calculate, based on the received request for the TR report, the amount of TR locations of a plurality of TR locations based on one or more parameters. In some aspects, 1310 may be performed by calculate component 1446 of FIG. 14. In some aspects, the one or more parameters may include CSF information including one or more of: a RI, a CQI, a PMI report, or one or more PDSCH parameters associated with a last slot. In some aspects, the RI, the PMI, or the CQI may be signaled by the UE. In some aspects, in order to calculate the amount of TR locations, the UE may hypothesis testing on a PDSCH based on predefined LUTs. Each LUT of the LUTs may be associated with a rank, a CQI, or a MCS. Each rank, CQI, or MCS may be associated with a defined TR amount. The TR report may include a relative value compared with the defined TR amount.

At 1312, the UE may transmit, to the base station, the TR report including an indication of the amount of TR locations based on the one or more parameters. For example, the UE 1102 may transmit, to the base station 1104, the TR report 1114 including an indication of the amount of TR locations based on the one or more parameters. In some aspects, 1312 may be performed by TR report component 1444 of FIG. 14. In some aspects, the TR report may include one or more vectors of values of the amount of TR locations, each vector may be associated with an SINR or an MCS. In some aspects, the transmission may be performed periodically based on a periodicity. In some aspects, the periodicity may be signaled by the base station based on CSI-RS signaling or CSF periodicity. In some aspects, the TR report may further include one or more location estimation metrics including one or more of: a channel energy, a capacity, a covariance determinant, or a condition number.

At 1314, the UE may receive, from the base station via RRC signaling, DCI, or a MAC-CE, an indication representing that the TR report is used. For example, the UE 1102 may receive, from the base station 1104 via RRC signaling, DCI, or a MAC-CE, an indication 1116 representing that the TR report is used. In some aspects, 1314 may be performed by indication component 1448 of FIG. 14.

Figure 14:
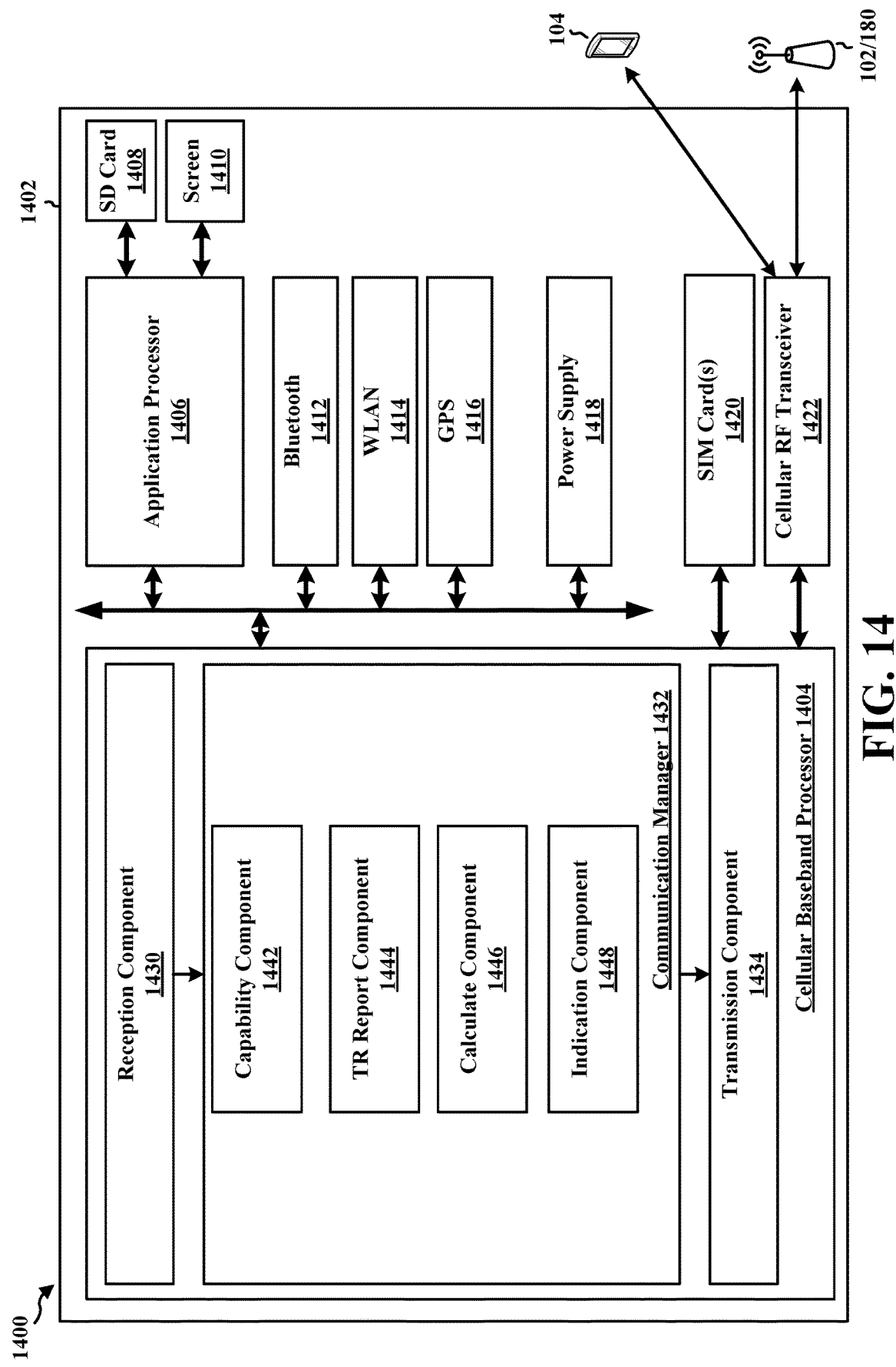
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include a capability component 1442 that is configured to estimate the capability of the UE associated with the one or more operating modes or transmit, to a base station, an indication of a capability of the UE associated with one or more operating modes, e.g., as described in connection with 1202 of FIG. 12 and 1302 of FIG. 13. The communication manager 1432 may further include a TR report component 1444 that may be configured to receive, from the base station, a request for a TR report corresponding to an amount of TR locations or transmit, to the base station, the TR report including an indication of the amount of TR locations based on the one or more parameters, e.g., as described in connection with 1204 and 1208 of FIGS. 12 and 1306 and 1312 of FIG. 13. The communication manager 1432 may further include a calculate component 1446 that may be configured to calculate, based on the received request for the TR report, the amount of TR locations of a plurality of TR locations based on one or more parameters, e.g., as described in connection with 1206 of FIG. 12 and 1310 of FIG. 13. The communication manager 1432 may further include an indication component 1448 that may be configured to receive, from the base station, an indication of at least one of a PAPR gain or a UE performance gain associated with the amount of TR locations or receive, from the base station via RRC signaling, DCI, or a MAC-CE, an indication representing that the TR report is used, e.g., as described in connection with 1308 and 1314 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for transmitting, to a base station, an indication of a capability of the UE associated with one or more operating modes. The cellular base band processor 1404 may further include means for receiving, from the base station, a request for a TR report corresponding to an amount of TR locations, the amount of TR locations being associated with at least one of a PAPR gain or a UE performance gain. The cellular base band processor 1404 may further include means for calculating, based on the received request for the TR report, the amount of TR locations of a plurality of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes. The cellular base band processor 1404 may further include means for transmitting, to the base station, the TR report including an indication of the amount of TR locations based on the one or more parameters. The cellular base band processor 1404 may further include means for estimating the capability of the UE associated with the one or more operating modes. The cellular base band processor 1404 may further include means for receiving, from the base station, an indication of at least one of a PAPR gain or a UE performance gain associated with the amount of TR locations. The cellular base band processor 1404 may further include means for hypothesis testing on a PDSCH based on predefined LUTs. The cellular base band processor 1404 may further include means for receiving, from the base station via RRC signaling, DCI, or a MAC-CE, an indication representing that the TR report is used. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
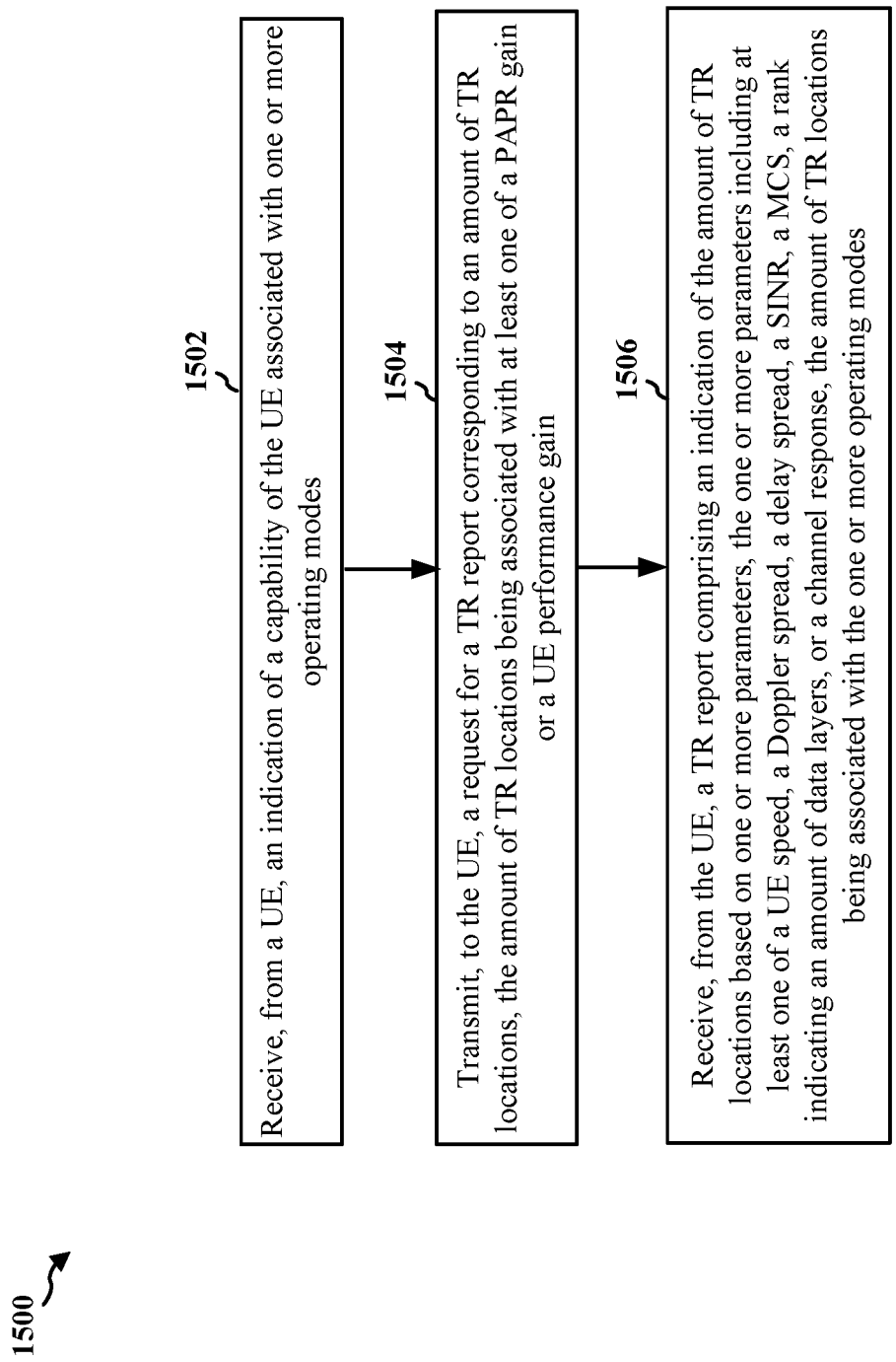
FIG. 15 is a flowchart of a method of wireless communication.

FIG. 15 is a flowchart 1500 of a method of wireless communication. The method may be performed by a base station (e.g., the base station 102/180, the base station 1104; the apparatus 1702.

At 1502, the base station may receive, from a UE, an indication of a capability of the UE associated with one or more operating modes. For example, the base station 1104 may receive, from a UE 1102, an indication of a capability 1106 of the UE associated with one or more operating modes. In some aspects, 1502 may be performed by capability component 1742 of FIG. 17.

At 1504, the base station may transmit, to the UE, a request for a TR report corresponding to an amount of TR locations. The amount of TR locations may be associated with at least one of a PAPR gain or a UE performance gain. For example, the base station 1104 may transmit, to the UE 1102, a request 1108 for a TR report corresponding to an amount of TR locations, the amount of TR locations being associated with at least one of a PAPR gain or a UE performance gain. In some aspects, 1504 may be performed by TR report component 1744 of FIG. 17.

At 1506, the base station may receive, from the UE, a TR report including an indication of the amount of TR locations based on one or more parameters. The one or more parameters may include at least one of a UE speed, a Doppler spread, a delay spread, a SINR, a MCS, a rank indicating an amount of data layers, or a channel response. The amount of TR locations may be associated with the one or more operating modes. For example, the base station 1104 may receive, from the UE 1102, a TR report 1114 including an indication of the amount of TR locations based on one or more parameters. In some aspects, 1506 may be performed by TR report component 1744 of FIG. 17.

Figure 16:
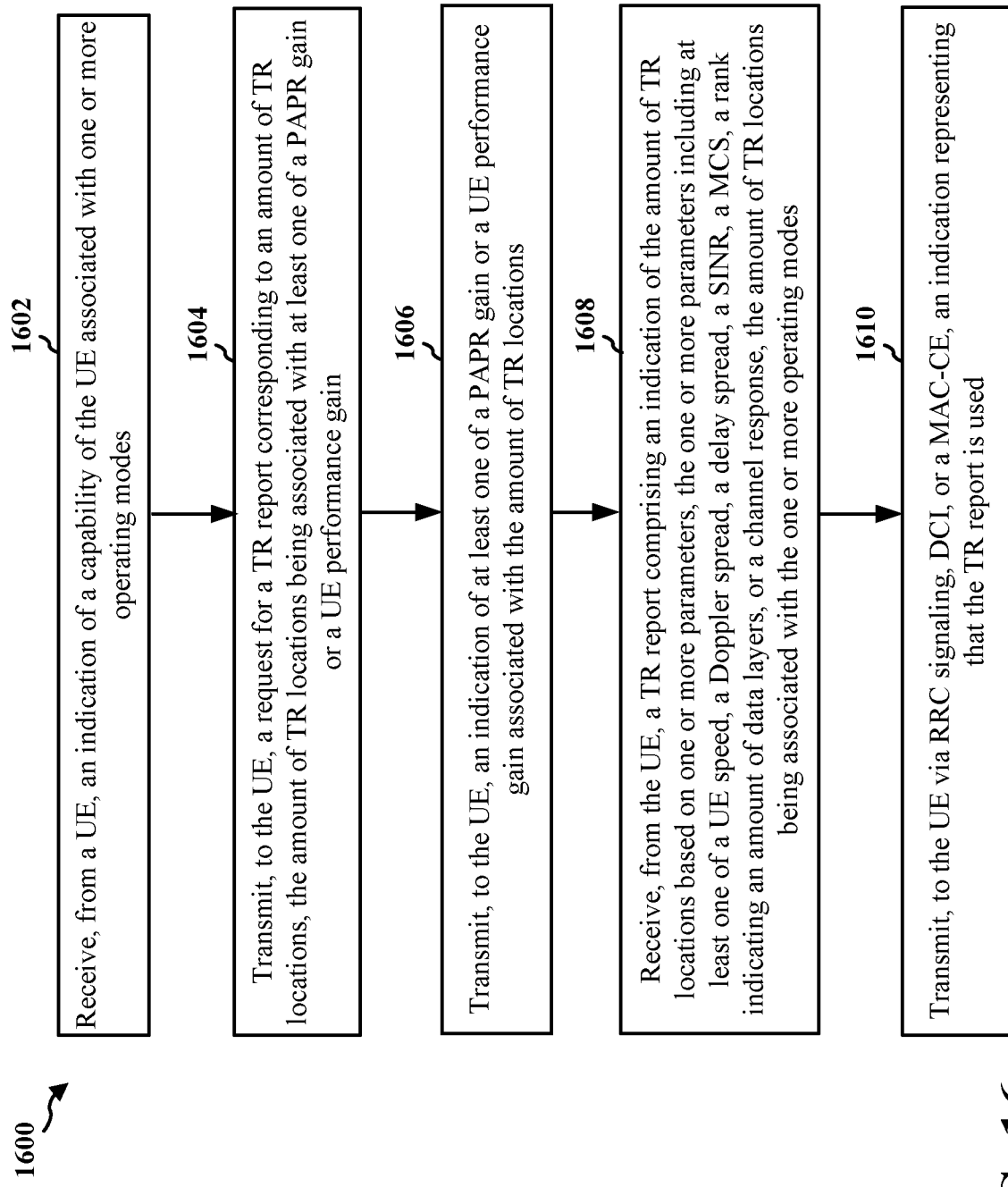
FIG. 16 is a flowchart of a method of wireless communication.

FIG. 16 is a flowchart 1600 of a method of wireless communication. The method may be performed by a base station (e.g., the base station 102/180, the base station 1104; the apparatus 1702.

At 1602, the base station may receive, from a UE, an indication of a capability of the UE associated with one or more operating modes. For example, the base station 1104 may receive, from a UE 1102, an indication of a capability 1106 of the UE associated with one or more operating modes. In some aspects, 1602 may be performed by capability component 1742 of FIG. 17.

At 1604, the base station may transmit, to the UE, a request for a TR report corresponding to an amount of TR locations. The amount of TR locations may be associated with at least one of a PAPR gain or a UE performance gain. For example, the base station 1104 may transmit, to the UE 1102, a request 1108 for a TR report corresponding to an amount of TR locations, the amount of TR locations being associated with at least one of a PAPR gain or a UE performance gain. In some aspects, 1604 may be performed by TR report component 1744 of FIG. 17. In some aspects, the request for the TR report may be transmitted via RRC signaling, DCI, or MAC-CE. In some aspects, the amount of TR locations may correspond to a percentage of TR locations.

At 1606, the base station may transmit, to the UE, an indication of at least one of a PAPR gain or a UE performance gain associated with the amount of TR locations. For example, the base station 1104 may transmit, to the UE 1102, an indication 1110 of at least one of a PAPR gain or a UE performance gain associated with the amount of TR locations. In some aspects, 1606 may be performed by indication component 1746 of FIG. 17. In some aspects, at least one of a PAPR gain or a UE performance gain associated with the amount of TR locations may be predefined or preconfigured.

At 1608, the base station may receive, from the UE, a TR report including an indication of the amount of TR locations based on one or more parameters. The one or more parameters may include at least one of a UE speed, a Doppler spread, a delay spread, a SINR, a MCS, a rank indicating an amount of data layers, or a channel response. The amount of TR locations may be associated with the one or more operating modes. For example, the base station 1104 may receive, from the UE 1102, a TR report 1114 including an indication of the amount of TR locations based on one or more parameters. In some aspects, 1608 may be performed by TR report component 1744 of FIG. 17. In some aspects, the one or more operating modes may correspond to at least one of a non-puncturing mode, a puncturing mode, or a rate matching mode. The non-puncturing mode may be unassociated with the amount of TR locations. The puncturing mode may correspond to one or more subcarriers that are demodulated to a zero value for the amount of TR locations. The rate matching mode may correspond to a decreased transform block size or an increased code rate associated with the amount of TR locations. In some aspects, the one or more parameters may include CSF information including one or more of: a RI, a CQI, a PMI report, or one or more PDSCH parameters associated with a last slot. In some aspects, the RI, the PMI, or the CQI may be signaled by the UE. In some aspects, the TR report may include one or more vectors of values of the amount of TR locations, each vector may be associated with an SINR or an MCS.

At 1610, the base station may transmit, to the UE via RRC signaling, DCI, or a MAC-CE, an indication representing that the TR report is used. For example, the base station 1104 may transmit, to the UE 1102 via RRC signaling, DCI, or a MAC-CE, an indication 1116 representing that the TR report is used. In some aspects, 1610 may be performed by indication component 1746 of FIG. 17.

Figure 17:
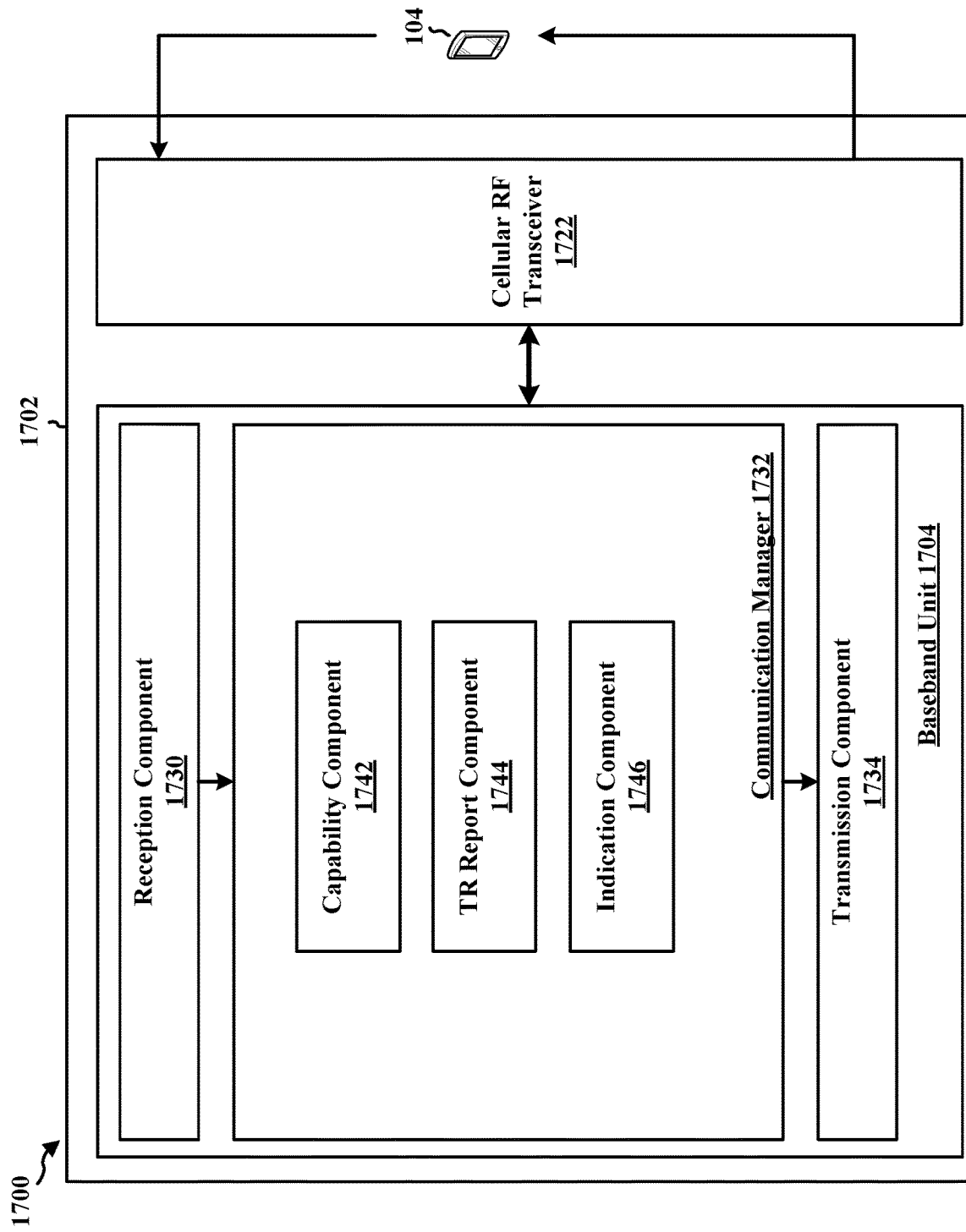
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1402 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 may include a capability component 1742 that may receive, from a UE, an indication of a capability of the UE associated with one or more operating modes, e.g., as described in connection with 1502 in FIGS. 15 and 1602 in FIG. 16. The communication manager 1732 further may include a TR report component 1744 that may transmit, to the UE, a request for a TR report corresponding to an amount of TR locations or receive, from the UE, a TR report including an indication of the amount of TR locations based on one or more parameters, e.g., as described in connection with 1504 and 1506 of FIGS. 15 and 1604 and 1608 of FIG. 16. The communication manager 1732 further may include an indication component 1746 that may transmit, to the UE via RRC signaling, DCI, or a MAC-CE, an indication representing that the TR report is used and may transmit, to the UE, an indication of at least one of a PAPR gain or a UE performance gain associated with the amount of TR locations, e.g., as described in connection with 1606 and 1610 of FIG. 16.

The apparatus may include additional components that perform each of the blocks of the algorithm in the flowcharts of FIGS. 15 and 16. As such, each block in the flowcharts of FIGS. 15 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, may include means for receiving, from a UE, an indication of a capability of the UE associated with one or more operating modes. The baseband unit 1704 may further include means for transmitting, to the UE, a request for a TR report corresponding to an amount of TR locations, the amount of TR locations being associated with at least one of a PAPR gain or a UE performance gain. The baseband unit 1704 may further include means for receiving, from the UE, a TR report including an indication of the amount of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes. The baseband unit 1704 may further include means for transmitting, to the UE, an indication of at least one of a PAPR gain or a UE performance gain associated with the amount of TR locations. The baseband unit 1704 may further include means for transmitting, to the UE via RRC signaling, DCI, or a MAC-CE, an indication representing that the TR report is used. The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is the apparatus for wireless communication at a UE, comprising: a memory; and at least one processor coupled to the memory and configured to: transmit, to a base station, an indication of a capability of the UE associated with one or more operating modes; receive, from the base station, a request for a TR report corresponding to an amount of TR locations, the amount of TR locations being associated with at least one of a PAPR gain or a UE performance gain; calculate, based on the received request for the TR report, the amount of TR locations of a plurality of TR locations based on one or more parameters, the one or more parameters including at least one of a UE speed, a Doppler spread, a delay spread, a SINK, a MCS, a rank indicating an amount of data layers, or a channel response, the amount of TR locations being associated with the one or more operating modes; and transmit, to the base station, the TR report comprising an indication of the amount of TR locations based on the one or more parameters.

Aspect 2 is the apparatus of aspect 1, wherein the one or more operating modes correspond to at least one of a non-puncturing mode, a puncturing mode, or a rate matching mode, wherein the non-puncturing mode is unassociated with the amount of TR locations, wherein the puncturing mode corresponds to one or more subcarriers that are demodulated to a zero value for the amount of TR locations, and wherein the rate matching mode corresponds to a decreased transform block size or an increased code rate associated with the amount of TR locations.

Aspect 3 is the apparatus of any of aspects 1-2, wherein the at least one processor coupled to the memory is further configured to: estimate the capability of the UE associated with the one or more operating modes.

Aspect 4 is the apparatus of any of aspects 1-3, wherein the at least one processor coupled to the memory is further configured to: receive, from the base station, an indication of at least one of a PAPR gain or a UE performance gain associated with the amount of TR locations.

Aspect 5 is the apparatus of any of aspects 1-4, wherein at least one of a PAPR gain or a UE performance gain associated with the amount of TR locations is predefined or preconfigured.

Aspect 6 is the apparatus of any of aspects 1-5, wherein the request for the TR report is received via RRC signaling, DCI, or a MAC-CE.

Aspect 7 is the apparatus of any of aspects 1-6, wherein the amount of TR locations corresponds to a percentage of TR locations.

Aspect 8 is the apparatus of any of aspects 1-7, wherein the amount of TR locations is based on a channel awareness, a number of predefined TR locations, or signaled from the base station.

Aspect 9 is the apparatus of any of aspects 1-8, wherein the one or more parameters comprise CSF information comprising one or more of: a RI, a CQI, a PMI report, or one or more PDSCH parameters associated with a last slot.

Aspect 10 is the apparatus of any of aspects 1-9, wherein the RI, the PMI, or the CQI are signaled by the UE.

Aspect 11 is the apparatus of any of aspects 1-10, wherein the at least one processor coupled to the memory is further configured to calculate, based on the received request for the TR report, the amount of TR locations based on the one or more parameters by: hypothesis testing on a PDSCH based on predefined LUTs, wherein each LUT of the LUTs is associated with a rank, a CQI, or a MCS, wherein each rank, CQI, or MCS is associated with a defined TR amount, and wherein the TR report includes a relative value compared with the defined TR amount.

Aspect 12 is the apparatus of any of aspects 1-11, wherein the TR report includes one or more vectors of values of the amount of TR locations, each vector being associated with an SINR or an MCS.

Aspect 13 is the apparatus of any of aspects 1-12, wherein the at least one processor coupled to the memory is further configured to transmit, to the base station, the TR report comprising the indication of the amount of TR locations based on the one or more parameters periodically based on a periodicity.

Aspect 14 is the apparatus of any of aspects 1-13, wherein the periodicity is signaled by the base station based on CSI-RS signaling or CSF periodicity.

Aspect 15 is the apparatus of any of aspects 1-14, wherein the TR report further comprises one or more location estimation metrics comprising one or more of: a channel energy, a capacity, a covariance determinant, or a condition number.

Aspect 16 is the apparatus of any of aspects 1-15, wherein the at least one processor coupled to the memory is further configured to: receive, from the base station via RRC signaling, DCI, or a MAC-CE, an indication representing that the TR report is used.

Aspect 17 is the apparatus of any of aspects 1-16, further comprising a transceiver coupled to the at least one processor.

Aspect 18 is the apparatus for wireless communication at a base station, comprising: a memory; and at least one processor coupled to the memory and configured to: receive, from a UE, an indication of a capability of the UE associated with one or more operating modes; transmit, to the UE, a request for a TR report corresponding to an amount of TR locations, the amount of TR locations being associated with at least one of a PAPR gain or a UE performance gain; and receive, from the UE, a TR report comprising an indication of the amount of TR locations based on one or more parameters, the one or more parameters including at least one of a UE speed, a Doppler spread, a delay spread, a SINR, a MCS, a rank indicating an amount of data layers, or a channel response, the amount of TR locations being associated with the one or more operating modes.

Aspect 19 is the apparatus of aspect 18, wherein the one or more operating modes correspond to at least one of a non-puncturing mode, a puncturing mode, or a rate matching mode, wherein the non-puncturing mode is unassociated with the amount of TR locations, wherein the puncturing mode corresponds to one or more subcarriers that are demodulated to a zero value for the amount of TR locations, and wherein the rate matching mode corresponds to a decreased transform block size or an increased code rate associated with the amount of TR locations.

Aspect 20 is the apparatus of any of aspects 18-19, wherein the at least one processor coupled to the memory is further configured to: transmit, to the UE, an indication of at least one of a PAPR gain or a UE performance gain associated with the amount of TR locations.

Aspect 21 is the apparatus of any of aspects 18-20, wherein at least one of a PAPR gain or a UE performance gain associated with the amount of TR locations is predefined or preconfigured.

Aspect 22 is the apparatus of any of aspects 18-21, wherein the request for the TR report is transmitted via RRC signaling, DCI, or a MAC-CE.

Aspect 23 is the apparatus of any of aspects 18-22, wherein the amount of TR locations corresponds to a percentage of TR locations.

Aspect 24 is the apparatus of any of aspects 18-23, wherein the one or more parameters comprise CSF information comprising one or more of: a RI, a CQI, a PMI report, or one or more PDSCH parameters associated with a last slot.

Aspect 25 is the apparatus of any of aspects 18-24, wherein the RI, the PMI, or the CQI are signaled by the UE.

Aspect 26 is the apparatus of any of aspects 18-25, wherein the TR report includes one or more vectors of values of the amount of TR locations, each vector being associated with an SINR or an MCS.

Aspect 27 is the apparatus of any of aspects 18-26, wherein the at least one processor coupled to the memory is further configured to: transmit, to the UE via RRC signaling, DCI, or a MAC-CE, an indication representing that the TR report is used.

Aspect 28 is the apparatus of any of aspects 18-27, further comprising a transceiver coupled to the at least one processor.

Aspect 29 is a method of wireless communication for implementing any of aspects 1 to 17.

Aspect 30 is an apparatus for wireless communication including means for implementing any of aspects 1 to 17.

Aspect 31 is a computer-readable medium storing computer executable code, where the code when executed by a processor causes the processor to implement any of aspects 1 to 17.

Aspect 32 is a method of wireless communication for implementing any of aspects 18 to 28.

Aspect 33 is an apparatus for wireless communication including means for implementing any of aspects 18 to 28.

Aspect 34 is a computer-readable medium storing computer executable code, where the code when executed by a processor causes the processor to implement any of aspects 18 to 28.

What is claimed is:

1. An apparatus for wireless communication at a user equipment (UE), comprising:
   a memory; and
   at least one processor coupled to the memory and configured to:
      transmit, to a base station, an indication of a capability of the UE associated with one or more operating modes;
      receive, from the base station, a request for a tone reservation (TR) report corresponding to an amount of TR locations, the amount of TR locations being associated with at least one of a peak-to-average power ratio (PAPR) gain or a UE performance gain;
      calculate, based on the received request for the TR report, the amount of TR locations of a plurality of TR locations based on one or more parameters, the one or more parameters including at least one of a UE speed, a Doppler spread, a delay spread, a signal-to-interference plus noise ratio (SINR), a modulation and coding scheme (MCS), a rank indicating an amount of data layers, or a channel response, the amount of TR locations being associated with the one or more operating modes;

transmit, to the base station, the TR report comprising an indication of the amount of TR locations based on the one or more parameters; and receive, from the base station, a downlink communication based on the amount of TR locations indicated in the TR report.

2. The apparatus of claim 1, wherein the one or more operating modes correspond to at least one of:
 a non-puncturing mode, wherein the non-puncturing mode is unassociated with the amount of TR locations;
 a puncturing mode, wherein the puncturing mode corresponds to one or more subcarriers that are demodulated to a zero value for the amount of TR locations; or
 a rate matching mode, wherein the rate matching mode corresponds to a decreased transform block size or an increased code rate associated with the amount of TR locations.

3. The apparatus of claim 1, wherein the at least one processor coupled to the memory is further configured to:
 estimate the capability of the UE associated with the one or more operating modes.

4. The apparatus of claim 1, wherein the at least one processor coupled to the memory is further configured to:
 receive, from the base station, an indication of the at least one of the PAPR gain or the UE performance gain associated with the amount of TR locations.

5. The apparatus of claim 1, wherein the at least one of the PAPR gain or the UE performance gain associated with the amount of TR locations is predefined or preconfigured.

6. The apparatus of claim 1, wherein to receive the request for the TR report, the at least one processor is configured to receive the request for the TR report via radio resource control (RRC) signaling, downlink control information (DCI), or a medium access control (MAC) control element (CE) (MAC-CE).

7. The apparatus of claim 1, wherein the amount of TR locations corresponds to a percentage of TR locations.

8. The apparatus of claim 1, wherein the amount of TR locations is based on a channel awareness, a number of predefined TR locations, or signaled from the base station.

9. The apparatus of claim 1, wherein the one or more parameters comprise channel state feedback (CSF) information comprising one or more of: a rank indicator (RI), a channel quality indicator (CQI), a pre-coding matrix indicator (PMI) report, or one or more physical downlink shared channel (PDSCH) parameters associated with a last slot.

10. The apparatus of claim 9, wherein the RI, the PMI, or the CQI is signaled by the UE.

11. The apparatus of claim 1, wherein the at least one processor coupled to the memory is further configured to calculate, based on the received request for the TR report, the amount of TR locations based on the one or more parameters by:
 hypothesis testing on a physical downlink shared channel (PDSCH) based on predefined look-up tables (LUTs), wherein each LUT of the LUTs is associated with the rank, the rank being associated with a defined TR amount, a channel quality indicator (CQI), the CQI being associated with the defined TR amount, or the MCS, the MCS being associated with the defined TR amount, and wherein the TR report includes a relative value compared with the defined TR amount.

12. The apparatus of claim 1, wherein the TR report includes one or more vectors of values of the amount of TR locations.

13. The apparatus of claim 1, wherein the at least one processor coupled to the memory is further configured to periodically transmit based on a periodicity, to the base station, the TR report comprising the indication of the amount of TR locations based on the one or more parameters.

14. The apparatus of claim 13, wherein the periodicity is signaled by the base station based on channel state information (CSI) reference signal (RS) (CSI-RS) signaling or channel state feedback (CSF) periodicity.

15. The apparatus of claim 14, wherein the TR report further comprises one or more location estimation metrics comprising one or more of: a channel energy, a capacity, a covariance determinant, or a condition number.

16. The apparatus of claim 1, wherein the at least one processor coupled to the memory is further configured to:
 receive, from the base station via radio resource control (RRC) signaling, downlink control information (DCI), or a medium access control (MAC) control element (CE) (MAC-CE), an indication representing that the TR report is used.

17. The apparatus of claim 1, further comprising a transceiver coupled to the at least one processor.

18. An apparatus for wireless communication at a base station, comprising:
 a memory; and
 at least one processor coupled to the memory and configured to:
  receive, from a user equipment (UE), an indication of a capability of the UE associated with one or more operating modes;
  transmit, to the UE, a request for a tone reservation (TR) report corresponding to an amount of TR locations, the amount of TR locations being associated with at least one of a peak-to-average power ratio (PAPR) gain or a UE performance gain;
  receive, from the UE, a TR report comprising an indication of the amount of TR locations based on one or more parameters, the one or more parameters including at least one of a UE speed, a Doppler spread, a delay spread, a signal-to-interference plus noise ratio (SINR), a modulation and coding scheme (MCS), a rank indicating an amount of data layers, or a channel response, the amount of TR locations being associated with the one or more operating modes; and
  transmit, to the UE, a downlink communication based on the amount of TR locations indicated in the TR report.

19. The apparatus of claim 18, wherein the one or more operating modes correspond to at least one of:
 a non-puncturing mode, wherein the non-puncturing mode is unassociated with the amount of TR locations;
 a puncturing mode, wherein the puncturing mode corresponds to one or more subcarriers that are demodulated to a zero value for the amount of TR locations; or
 a rate matching mode, wherein the rate matching mode corresponds to a decreased transform block size or an increased code rate associated with the amount of TR locations.

20. The apparatus of claim 18, wherein the at least one processor coupled to the memory is further configured to:

transmit, to the UE, an indication of the at least one of the PAPR gain or the UE performance gain associated with the amount of TR locations.

21. The apparatus of claim 18, wherein the at least one of the PAPR gain or the UE performance gain associated with the amount of TR locations is predefined or preconfigured.

22. The apparatus of claim 18, wherein to transmit the request for the TR report, the at least one processor is configured to transmit the request for the TR report via radio resource control (RRC) signaling, downlink control information (DCI), or a medium access control (MAC) control element (CE) (MAC-CE).

23. The apparatus of claim 18, wherein the amount of TR locations corresponds to a percentage of TR locations.

24. The apparatus of claim 18, wherein the one or more parameters comprise channel state feedback (CSF) information comprising one or more of: a rank indicator (RI), a channel quality indicator (CQI), a pre-coding matrix indicator (PMI) report, or one or more physical downlink shared channel (PDSCH) parameters associated with a last slot.

25. The apparatus of claim 24, wherein the RI, the PMI, or the CQI is signaled by the UE.

26. The apparatus of claim 18, wherein the TR report includes one or more vectors of values of the amount of TR locations, each vector being associated with an SINR or an MCS.

27. The apparatus of claim 18, wherein the at least one processor coupled to the memory is further configured to:
transmit, to the UE via radio resource control (RRC) signaling, downlink control information (DCI), or a medium access control (MAC) control element (CE) (MAC-CE), an indication representing that the TR report is used.

28. The apparatus of claim 18, further comprising a transceiver coupled to the at least one processor.

29. A method for wireless communication at a user equipment (UE), comprising:
transmitting, to a base station, an indication of a capability of the UE associated with one or more operating modes;
receiving, from the base station, a request for a tone reservation (TR) report corresponding to an amount of TR locations, the amount of TR locations being associated with at least one of a peak-to-average power ratio (PAPR) gain or a UE performance gain;
calculating, based on the received request for the TR report, the amount of TR locations of a plurality of TR locations based on one or more parameters, the one or more parameters including at least one of a UE speed, a Doppler spread, a delay spread, a signal-to-interference plus noise ratio (SINR), a modulation and coding scheme (MCS), a rank indicating an amount of data layers, or a channel response, the amount of TR locations being associated with the one or more operating modes;
transmitting, to the base station, the TR report comprising an indication of the amount of TR locations based on the one or more parameters; and
receiving, from the base station, a downlink communication based on the amount of TR locations indicated in the TR report.

30. A method for wireless communication at a base station, comprising:
receiving, from a user equipment (UE), an indication of a capability of the UE associated with one or more operating modes;
transmitting, to the UE, a request for a tone reservation (TR) report corresponding to an amount of TR locations, the amount of TR locations being associated with at least one of a peak-to-average power ratio (PAPR) gain or a UE performance gain;
receiving, from the UE, a TR report comprising an indication of the amount of TR locations based on one or more parameters, the one or more parameters including at least one of a UE speed, a Doppler spread, a delay spread, a signal-to-interference plus noise ratio (SINK), a modulation and coding scheme (MCS), a rank indicating an amount of data layers, or a channel response, the amount of TR locations being associated with the one or more operating modes; and
transmitting, to the UE, a downlink communication based on the amount of TR locations indicated in the TR report.

* * * * *